(12) United States Patent
Yamada

(10) Patent No.: US 6,198,853 B1
(45) Date of Patent: Mar. 6, 2001

(54) SEMICONDUCTOR OPTICAL FUNCTIONAL ELEMENT

(75) Inventor: Koji Yamada, Tokyo (JP)

(73) Assignee: Oki Electric Industry Co., Ltd.

( * ) Notice: Subject to any disclaimer, the term of this patent is extended or adjusted under 35 U.S.C. 154(b) by 0 days.

(21) Appl. No.: 09/182,881

(22) Filed: Oct. 30, 1998

(30) Foreign Application Priority Data

Oct. 31, 1997 (JP) .................................................... 9-301301
Jan. 28, 1998 (JP) ................................................. 10-030477

(51) Int. Cl.[7] .................................................. G02F 1/025
(52) U.S. Cl. .................................. 385/2; 257/458; 385/1; 385/131
(58) Field of Search .............................. 257/458, 79, 183, 257/613, 615; 385/1–3, 129, 131, 132

(56) References Cited

U.S. PATENT DOCUMENTS

| | | | |
|---|---|---|---|
| 5,684,308 | * 11/1997 | Lovejoy et al. | 257/458 X |
| 5,689,122 | * 11/1997 | Chandrasekhar | 257/458 X |
| 5,789,765 | * 8/1998 | Nishikata et al. | 257/458 X |
| 5,926,585 | * 7/1999 | Irikawa et al. | 385/131 X |
| 6,005,266 | * 12/1999 | Forrest et al. | 257/458 X |

OTHER PUBLICATIONS

Hirohisa Sano et al., "Structural Dependence of a Modulation Characteristics of MQW EA Modulators", Proceedings of the Denshi Jouhou Tsuushin Gakkai, C–156, pp. 4–198, Autumn 1990.

Isamu Kotaka et al., "High–Speed InGaAlAs/InAlAs Multiple Quantum Well Optical Modulators with Bandwiths in Excess of 20 GHz at 1.55 $\mu$m", IEEE Photonics Technology Letters, vol. 1, No. 5, May 1989, pp. 100–101.

Koichi Wakita et al., "High–Speed Electrooptic Phase Modulators Using InGaAs/InAlAs Multiple Quantum Well Waveguides", IEEE Photonics Technology Letters, vol. 1, No. 12, Dec. 1989, pp. 441–442.

* cited by examiner

Primary Examiner—John D. Lee
(74) Attorney, Agent, or Firm—Rabin & Champagne, P.C.

(57) ABSTRACT

A semiconductor optical functional element driven with broad range of withstand voltage even if put in forward bias is provided a double heterojunction structure comprising a first conductivity-type cladding layer, an optical waveguide layer, and a second conductivity-type cladding layer on an underlying layer. The semiconductor optical functional element is further provided a first conductivity-type subcladding layer, forming a homojunction with the surface of this second conductivity-type cladding layer opposite from the optical waveguide layer. Consequently, this semiconductor optical functional element provides a PIN junction structure. Or, the semiconductor optical functional element is provided, on a lower cladding layer, a first stacked body and second stacked body, buried in an insulating layer. Such a first stacked body is formed of a light absorption layer and upper cladding layer stacked in that order on the lower cladding layer, forming a P-i-N heterojunction. Meanwhile, the second stacked body is formed of an intermediate semiconductor layer and upper cladding layer stacked in that order on the lower cladding layer, forming a P-i-N heterojunction. Consequently, this optical functional element is provided a P-i-N-i-P junction structure.

11 Claims, 18 Drawing Sheets

---- CONVENTIONAL DEVICE
—— FIRST EMBODIMENT

PRIOR ART

SEMICONDUCTOR OPTICAL FUNCTIONAL ELEMENT

BACKGROUND OF THE INVENTION

1. Field of the Invention

The present invention relates to a semiconductor optical functional element appropriate for use in super-high capacity optical telecommunications and super-high speed optical signal processing, and more particularly to a waveguide-type of semiconductor optical functional element, such as an electroabsorption optical modulator, a supersaturation absorption optical switch, or a wavelength switch.

2. Description of Related Art

For example, the semiconductor optical functional element disclosed in citation I: [Structural dependence of a Modulation characteristics of MQW EA Modulators, Sano et al., Autumn 1990 proceedings of the Denshi Jouhou Tsuushin Gakkai, C-156, p. 4-198] and the electroabsorption optical intensity modulator in citation II: [High-speed InGaAs/InAlAs multiple quantum well optical modulators with bandwidth in excess of 20 GHz at 1.55 μm, Isamu Kotaka et al., IEEE Photon. Techno. Lett. Vol. 1, No. 5, pp. 100–101, 1989] were known.

In the structure of the electroabsorption optical intensity modulator disclosed in these references, an n-type cladding layer, i-type optical waveguide layer, p-type cladding layer, and p-type ohmic contact layer are formed in that order on an n-type semiconductor substrate; a PIN double heterojunction structure is thereby formed with the n-type layers, optical waveguide layer, and p-type layers.

When reverse voltage is applied to the PIN structure (double heterojunction structure) of an optical modulator of this type, an electrical field is applied to the optical waveguide layer, which is an intrinsic layer (i-type layer), and the absorption of the electric field results in a high coefficient of optical absorption within the optical waveguide layer. The intensity of light introduced into this optical modulator from outside the structure is modulated by the applied voltage.

Other semiconductor optical functional elements include, for example, the conventional optical phase modulator having the PIN junction structure noted in "High-speed electro-optic phase modulators using InGaAs/InAlAs multiple quantum well waveguides," Koichi Wakita et al., IEEE Photon. Techno. Lett. Vol. 1, No. 12, pp. 441–442, 1989. In such a conventional optical phase modulator, light introduced from outside can undergo phase modulation in the optical waveguide layer when the PIN junction is put in reverse bias.

In some cases, these semiconductor optical functional elements were driven by applying forward bias voltage to the PIN structure thereof. For example, in some electroabsorption optical intensity modulators, the PIN structure is put in forward bias in order to adjust the form of an eye pattern (random blocks of an applied electrical signal) or to improve the extinction ratio (ratio of minimum value to maximum value of output light intensity).

However, the following problems occur when the PIN structure is put in forward bias.

First, the intensity of the electrical field applied to the PIN structure becomes small. As a result, the capacitance (electrostatic capacitance) becomes high because the depletion layer in the PIN structure becomes thin. This causes a mismatch of impedance to occur between the optical functional element and external circuitry, such as driving circuits, logic circuits, or the like, to thereby deteriorate the high frequency response characteristics.

Also, drift speed drops because of the reduced intensity of the electrical field applied to the PIN structure. Thus, the photocarrier sweep efficiency decreases, and the number of carriers generated from the optical waveguide layer becomes greater than the number of carriers swept from the optical waveguide layer. As a result, carriers accumulate within the optical waveguide layer and change the index of refraction of the optical waveguide layer. Change of the index of refraction increases the α parameter showing frequency variation.

The deterioration of the high frequency response characteristics and the increase of the α parameter are related to the deterioration of the quality of light propagation (or transmission), for example, the distortion of the waveform of light propagated within an optic fiber.

Second, when the forward bias exceeds the built in voltage of the PIN structure, current surges within the device.

ASE (amplified spontaneous emission: current flowing into the optical waveguide layer is converted to light and emitted) is thereby caused and this light is treated together with the modulated light within the optic fiber.

Third, the current flowing into the optical waveguide layer is converted to heat and Joule heat is emitted. As a result, the temperature of the optical functional element increases, causes changes in the properties thereof, and reduces the lifespan thereof.

Sometimes a forward surge of high power is applied unexpectedly to an optical functional element. The excessive Joule heat generated at such times in the element can bring about lethal deterioration, which is related to the destruction of the element.

However, there have been no countermeasures to resolve the various problems which might arise as a result of forward biasing of an electroabsorption optical intensity modulator, optical phase modulator, or other semiconductor optical functional element having a conventional PIN structure.

SUMMARY OF THE INVENTION

It is an object of the present invention to provide a semiconductor optical functional element which is not negatively influenced as to its characteristics when put in forward bias.

It is another object of the present invention to provide a semiconductor optical functional element with improved resistance to forward voltage and constituted so that substantially no electric current flows into the optical waveguide layer.

According to a first aspect of the present invention, there is provided a semiconductor optical functional element including an underlying layer and a double heterojunction structure formed on or above the underlying layer and comprising a first conductivity-type cladding layer, optical waveguide layer, and second conductivity-type cladding layer. Furthermore, the element is provided a first conductivity-type subcladding layer forming a homojunction with the surface of the second conductivity-type cladding layer opposite to the optical waveguide layer.

The presence of the homojunction of the first conductivity-type subcladding layer and the second conductivity-type cladding layer has the following effects. When forward biased voltage is applied to the double heterojunction structure, this homojunction is reverse biased. An energy barrier is thereby formed in the homojunction portion and prevents the carrier flow to the optical waveguide layer.

Thus, the carrier flow in the double heterojunction structure is prevented. Because the carrier flow into the optical waveguide layer is thereby reduced, the presence of carrier accumulation in the optical waveguide layer does not become a factor in changing the index of refraction of the optical waveguide layer. Therefore, phase modulation of the carrier frequency is reduced; this prevents the increase of the α parameter. Also, the high frequency response characteristics can be sustained because the capacitance of the double heterojunction structure does not become high.

Current does not flow in this optical functional element without the application of a voltage corresponding to the sum of the built in voltage of the double heterojunction structure and the reverse withstand voltage of the homojunction portion. Because reverse voltage is not applied to the optical waveguide layer in the double heterojunction structure, there is substantially no optical absorption at that time. For this reason, the generation of ASE and Joule heat in the optical waveguide layer can be suppressed.

In this type of semiconductor optical functional element, either or both of the concentration of impurities within the second conductivity-type cladding layer and the thickness of this layer may preferably be determined so as to have the following effect. When reverse voltage is applied to the double heterojunction structure, the first conductivity-type carrier, flowing from the first conductivity-type subcladding layer to the second conductivity-type cladding layer, combines with the second conductivity-type carrier in the second conductivity-type cladding layer, so as to prevent the first conductivity-type carrier from reaching the optical waveguide layer through the second conductivity-type cladding layer.

In a preferable embodiment of this semiconductor optical functional element, the first type of conductivity may be n-type and the second type of conductivity may be p-type. In a preferable embodiment, alternatively, the first type of conductivity may be p-type and the second type of conductivity may be n-type.

According to a preferred embodiment of a semiconductor optical functional element, the second conductivity-type cladding layer and the optical waveguide layer of the double heterojunction structure may preferably be buried in a current blocking layer. The current blocking layer may be formed in the following order vertically through the element: a second conductivity-type first blocking layer, a first conductivity-type blocking layer, and a second conductivity-type second blocking layer, with these being established on both sides of at least the optical waveguide layer and second conductivity-type cladding layer.

A semiconductor optical functional element, wherein the first conductivity-type subcladding layer is established between the underlying layer and the double heterojunction structure, may preferably have the following constitution. A first electrode is formed on the side of the first conductivity-type cladding layer which is opposite from the optical waveguide layer, and on this same side of the first conductivity-type cladding layer is formed a second electrode, which is electrically connected to the first conductivity-type subcladding layer.

Another preferable embodiment of a semiconductor optical functional element, wherein the first conductivity-type subcladding layer is interposed in the double heterojunction structure and located on the underlying layer, may have the following constitution. A first electrode is formed on the side of the first conductivity-type subcladding layer which is opposite to the double heterojunction structure, and on this same side of the first conductivity-type cladding layer is formed a second electrode, which is electrically connected to the first conductivity-type cladding layer.

According to a second aspect of the present invention, there is provided a semiconductor optical functional element including an underlying layer and a double heterojunction structure provided thereon and comprising a first conductivity-type cladding layer, an optical waveguide layer, and a second conductivity-type cladding layer. Furthermore, the present element is provided with a rectifying element comprising a first conductivity-type layer and a second conductivity-type layer, and wherein the second conductivity-type layer is electrically connected to the second conductivity-type cladding layer.

This rectifying element is, for example, a pn junction element (i.e. diode). The diode comprises a first conductivity-type layer and a second conductivity-type layer. The first type of conductivity may be n-type and the second type of conductivity may be p-type; or the first type of conductivity may be p-type and the second type of conductivity may be n-type. According to the present invention, the second conductivity-type layer of the rectifying element is electrically connected to the second conductivity-type cladding layer of a semiconductor optical functional element having a double heterojunction structure. The first conductivity-type layer of the rectifying element can thereby play essentially the same role as the first conductivity-type subcladding layer explained above. The same effects as the first conductivity-type subcladding layer are thereby attained. In the event that a surge of excessive forward voltage is unexpectedly applied to this semiconductor optical functional element, it is the rectifying element, like an inexpensive diode, which will be damaged and damage to the expensive optical functional element (double heterojunction structure) can be avoided. This keeps maintenance costs low when the semiconductor optical functional element is used in optical telecommunications systems.

According to a third aspect of the present invention, there is provided a semiconductor optical functional element including a first and second semiconductor layer structure, a resistive layer, and a first and second voltage applying means. The first semiconductor layer structure comprises a shared or common cladding layer, optical waveguide layer, and a first separate or individual cladding layer, established in that order. The second semiconductor structure comprises a shared or common cladding layer, an intermediate semiconductor layer, and a second separate or individual cladding layer, formed in that order. The resistive layer separates at least the first separate cladding layer and the second separate cladding layer. The first voltage applying means is connected to the first separate cladding layer. The second voltage applying means is connected to the second separate cladding layer. The common cladding layer comprises a semiconductor layer of one conductivity type. Alternatively, the first separate cladding layer, and second separate cladding layer comprise semiconductor layers of the other conductivity types.

With such a constitution, the first voltage applying means is electrically connected to the optical waveguide layer by means of the first separate cladding layer; the second voltage applying means is electrically connected to the optical waveguide layer by means of the second separate cladding layer, intermediate semiconductor layer, and common cladding layer. Consequently, the application of voltages from the first voltage applying means and second voltage applying means applies the desired electrical field to the optical waveguide layer and can sweep out photocarriers generated in the optical waveguide layer.

As a result, the semiconductor optical functional element according to the third aspect of the present invention, allows for the desired processing, electrical-to-optical, or optical-to-electrical conversion, or the like, to be continually applied to light which remains contained while propagating within the optical waveguide layer.

Further, according to the element of the third aspect, when the optical waveguide layer is forward biased, the intermediate semiconductor layer is put in reverse bias, because the conductivity types of the first and second separate cladding layers are mutually different from the conductivity type of the common cladding layer. In other words, this element can effect stable, highly reliable processing on light propagating in the optical waveguide layer, due to the forward biased electrical field, without current flowing into the optical waveguide layer. As a result, the uses of the semiconductor optical functional element can be expanded.

Further, according to the element of the third aspect, the following problems, which are likely to occur in conventional semiconductor optical functional elements, are suppressed because the introduction of current to the optical waveguide layer is thereby suppressed: damage to the element by Joule heat, the generation of ASE, and electrical reflection to the power supply mechanism.

Furthermore, the resistance value of the resistive layer is adjusted in advance when the optical functional element is manufactured; electrical reflection to the power supply mechanism can thereby be further suppressed. This resistive layer may have a resistance value which is sufficiently high compared to the forward resistance of the PIN junction formed between the layers comprising this element.

In other words, in a semiconductor optical functional element, the electrical path, via the shared or common cladding layer for applying the electrical field to the optical waveguide layer, is normally limited on the basis of the material and form, for example, because of the relationship to the vertical light containment or confinement effects in the optical waveguide layer. Consequently, the impedance of the electrical path via the common cladding layer for applying the electrical field to the optical waveguide layer is thought to be limited by design in the semiconductor optical functional element. In the invention according to the first aspect, an electrical connection is formed between the first separate or individual cladding layer connected to the first voltage applying means and the second separate or individual cladding layer connected to the second voltage applying means, by the resistive layer and the electrical path, by way of the shared or common cladding layer for applying the electrical field to the optical waveguide layer established parallel thereto.

Consequently, according to the element of the third aspect, providing the resistive layer with the previously established resistance value will establish the value of the impedance of the semiconductor optical functional element itself, in relation to voltage applied from the first and second voltage applying means. Thus, the resistance value of the resistive layer is established in advance when the element is formed; it is thereby possible to match the impedance with the external circuitry, and consequently, it becomes possible to suppress electrical reflection to the power supply mechanism.

As discussed above, by suppressing electrical reflection to the power supply mechanism, the generation of ASE, and damage to the element, the semiconductor optical functional element according to the third aspect can provide an optical functional element which improves the quality of optical propagation or transmission and which makes possible reliable optical processing.

In order to realize the optical functional element according to this aspect, it is preferable that the resistive layer be designed so as to separate the optical waveguide layer and intermediate semiconductor layer.

With the third aspect discussed above, an intermediate semiconductor layer is established between the first separate or individual cladding layer and the shared or common cladding layer. However, such an intermediate semiconductor layer is not an indispensable structural element of the present invention when the present invention is applied to a specific use, such as processing light only in the optical waveguide layer, for example.

Consequently, according to a fourth aspect of the present invention, a semiconductor optical functional element is provided the following:

a first semiconductor layer structure with the shared or common cladding layer, optical waveguide layer, and first separate or individual cladding layer stacked in that order;

a second semiconductor layer structure with the shared or common cladding layer and second separate or individual cladding layer stacked in that order;

a resistive layer separating at least the first separate cladding layer and second separate cladding layer;

a first voltage applying means connected to the first separate cladding layer; and a second voltage applying means connected to the second separate cladding layer;

wherein the common cladding layer, first separate cladding layer, and second cladding layer comprise semiconductor layers with different types of conductivity.

Like the optical functional element according to the third aspect, the semiconductor optical functional element having such a structure of the fourth aspect can continuously carry out the prescribed processing, such as electricity to light or light to light conversion, of light propagating and confined within the optical waveguide layer; meanwhile, it is also possible to realize a semiconductor optical functional element which can carry out stable and highly reliable processing for a wide variety of uses.

Furthermore, because the intermediate semiconductor layer is not included, the optical functional element according to the fourth aspect has the result that the energy barrier, generated in the junction of the common cladding layer and the second separate cladding layer of the second semiconductor layer structure, does not become discontinuous. Consequently, this optical functional element can realize high speed sweeping of photocarrier from the optical waveguide layer, and thereby high speed optical processing, as compared to the optical functional element of the third aspect.

In the optical functional element relating to the third and fourth aspects, the resistive layer may preferably be an insulating layer. With this constitution, the first separate cladding layer and second separate cladding layer are electrically connected only by the electrical path through the common cladding layer for applying the electrical field to the optical waveguide layer. Consequently, even when voltage is applied from the first and second voltage applying means, the generation of current by the semiconductor optical functional element can be suppressed. As a result, it is possible to realize a semiconductor optical functional element, characterized by long term, stable operation due to the suppression of changes in its properties from heat generation.

Furthermore, in the optical functional element of the third and fourth aspects, the carrier concentration of the optical waveguide layer may preferably be made lower than the carrier concentration in the common cladding layer and first cladding layer. With such a structure, the width of the depletion layer in the vicinity of the first optical waveguide layer can be easily increased; therefore, the semiconductor optical functional element can more effectively process light guided by the optical waveguide layer.

Furthermore, in the element of the third and fourth aspects, a double heterojunction structure may preferably be formed by the common cladding layer, optical waveguide layer, and first separate cladding layer. With such a structure, containment or confinement of light in the optical waveguide layer can be made more effective. Consequently, a semiconductor optical functional element, with little light propagation loss can be realized.

Furthermore, the element of the third and fourth aspects may include the constitution wherein the real part of the complex index of refraction of the optical waveguide layer is changed by the application of the electrical field, or the constitution wherein the imaginary part of the complex index of refraction of the optical waveguide layer is changed by the application of the electrical field. With such a constitution, the absorption coefficient and index of refraction of the optical waveguide layer can be varied by controlling the voltage applied from the first and second voltage applying means. Consequently, this semiconductor optical functional element can effect with the applied voltage the prescribed processing of the light propagated in the optical waveguide layer.

Furthermore, the element of the third and fourth aspects may include the constitution wherein the real part of the complex index of refraction of the optical waveguide layer is varied by the input of light to the optical waveguide layer, or the constitution where in the imaginary part of the complex index of refraction of the optical waveguide layer is varied by the input of light to the optical waveguide layer. With such a constitution, the input of light can provide the prescribed change in the index of refraction and the prescribed change in the absorption coefficient to the optical waveguide layer, even if the voltage applied from outside is not changed. Consequently, with light, this semiconductor optical functional element can effect the prescribed processing of light transmitted in the optical waveguide layer.

Furthermore, the semiconductor optical functional element of the third or fourth aspects can be on the same substrate as the semiconductor laser source. With this structure, it is possible to realize small and inexpensive optical signal emitters, optical signal modulators, or the like.

BRIEF DESCRIPTION OF THE DRAWINGS

The foregoing and other objects, feature and advantages of the present invention will be better understood from the following description taken in connection with the accompanying drawings, in which.

DESCRIPTION OF THE PREFERRED EMBODIMENTS

With reference to drawings, embodiments of the present invention are hereinafter explained. The figures are only to provide a schematic illustration for understanding the present invention and do not limit the invention. Also, in the figures, the shaded areas shown in the cross sections are simplified in part, to make the figure easier to understand.

[I] The explanation will be given to the case where the first and second aspects of the present invention summarized above will be applied to optical modulators.

First Embodiment

Figure 1A:
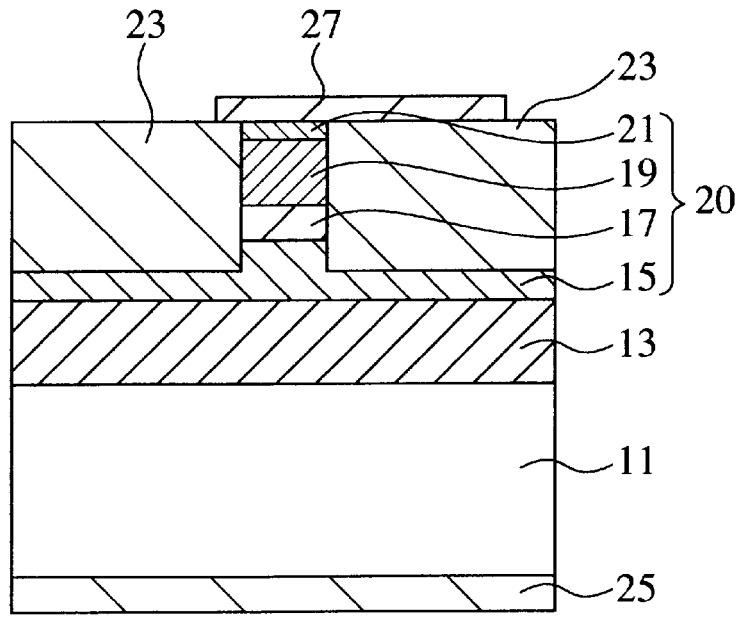
FIGS. 1(A) and 1(B) are cross sectional views of a semiconductor optical modulator device for explaining the first embodiment of the present invention.

FIG. 1(A) is a cross-sectional view of the semiconductor optical modulator device of the first embodiment. This optical modulator device is provided an underlying layer, and on the underlying layer, a double heterojunction structure comprising a first conductivity-type cladding layer, optical waveguide layer, and second conductivity-type cladding layer. This optical modulator device is further provided a first conductivity-type subcladding layer having a homojunction with the surface of the second conductivity-type cladding layer which is opposite from the optical waveguide layer. In the semiconductor optical modulator device of the first embodiment, the first conductivity-type subcladding layer is established between the underlying layer and the double heterojunction structure.

In this embodiment, the underlying layer 11 is a $1 \times 10^{18}$ $cm^{-3}$ $n^+$-InP substrate; the first type of conductivity is n-type and the second type of conductivity is p-type. An n-InP subcladding layer as the first conductivity-type subcladding layer 13, a p-InP cladding layer as the second conductivity-type cladding layer 15, an undoped InGaAsP layer as the optical waveguide layer 17, and an n-InP cladding layer as the first conductivity-type cladding layer 19, are layered or stacked in that order on the underlying layer 11. An $n^{++}$-InGaAs layer is established as an ohmic contact layer 21 on the first conductivity-type cladding layer 19.

Here, the layered or stacked body comprising part of the second conductivity-type cladding layer 15, optical waveguide layer 17, the first conductivity-type cladding layer 19, and the ohmic contact layer 21, is in a mesa form. An electrical insulating layer 23, such as polyimide layer, is formed on the upper region of the first conductivity-type subcladding layer 13 on both sides of this mesa portion 20 (FIG. 1(A) ). The mesa portion is buried in this insulating layer 23, which blocks the electrical field and contains or confines light in the optical waveguide layer. It may be possible to substitute a polyimide layer as the insulating layer 23, by other semiconductor layer such as, for example, Fe-doped InP or un-doped InP.

An electrode 25 is formed on the bottom surface of the underlying layer 11 and an electrode 27 is formed on the ohmic contact layer 21.

The carrier concentration of the first conductivity-type subcladding layer 13 is $5 \times 10^{17}$ $cm^{-3}$ and the film thickness is 1 µm; the carrier concentration of second conductivity-type cladding layer 15 is $5 \times 10^{17}$ $cm^{-3}$ and the film thickness is 1 µm; the thickness of the optical waveguide layer 17 is 0.2 to 0.3 µm; the carrier concentration of the first conductivity-type cladding layer 19 is $5 \times 10^{17}$ $cm^{-3}$ and film thickness is 1 µm; and the carrier concentration of the ohmic contact layer 21 is $1 \times 10^{18}$ $cm^{-3}$ and the film thickness is 0.2 µm.

Here, either or both of the carrier concentration and thickness of the second conductivity-type cladding layer 15 is determined as follows. When, reverse voltage is applied to this double heterojunction structure (first conductivity-type cladding layer 19, optical waveguide layer 17, and second conductivity-type cladding layer 15), electrons flow from the first conductivity-type subcladding layer 13 to the second conductivity-type cladding layer 15. The carrier concentration and layer thickness are determined so that these injected electrons combine with the positive holes in the second conductivity-type cladding layer 15, so that the electrons do not pass through the second conductivity-type cladding layer 15 to reach the optical waveguide layer 17. The carrier concentration and layer thickness are preferably determined as mentioned above and, for example, carrier concentration is $5 \times 10^{17}$ $cm^{-3}$ and the film thickness of layer 15 is 1 µm.

The optical waveguide layer 17 does not absorb incident light from outside when reverse voltage is not applied to the double heterojunction structure and does absorb incident light when reverse voltage is applied. Accordingly, the band gap wavelength of the optical waveguide layer is preferably established at short wavelengths of 30 nm to 100 nm, in relation to the wavelength of the incident light. This may be adjusted by varying the structure and composition of the optical waveguide layer 17 during the manufacture of the optical modulator device.

An antireflection film (not shown) is formed entirely over the end surface on which the light enters and the opposite end surface of the semiconductor optical modulator device. The antireflection film comprises a material transparent to the incident light, for example, a dielectric insulating film such as $SiO_2$ or SiN. This filmmay comprise one layer or several layers.

The MOCVD (metal organic chemical vapor deposition) method, MBE (molecular beam epitaxial) method or a the like method, is used in the formation of each layer comprising the principal element of the semiconductor optical modulator device relating to this embodiment. At this time, the n-type impurities used to form the n-type layers are Sn and S; the p-type impurities used to form the p-type layers are Zn or the like.

Figure 1B:
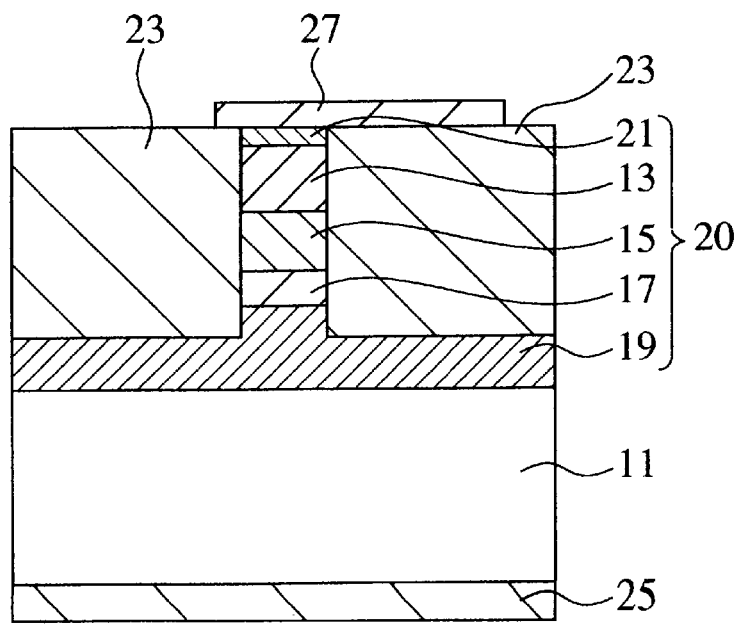

In the semiconductor optical modulator device of the present embodiment, the first conductivity-type subcladding layer may be formed on the underlying layer with the double heterojunction structure interposed. When the first type of conductivity is n-type and the second type of conductivity is p-type, as shown in FIG. 1(B), the following are layered or stacked in order on the underlying layer 11: a n-InP cladding layer as the first conductivity-type cladding layer 19, undoped InGaAsP layer as an optical waveguide layer 17, p-InP cladding layer as the second conductivity-type cladding layer 15, and n-InP subcladding layer as the first conductivity-type subcladding layer 13. An $n^{++}$-InGaAs layer is established an ohmic contact layer 21 on the first conductivity-type subcladding layer 13.

In this constitution, a mesa form is imparted to part of the first conductivity-type cladding layer 19 and the layered or stacked body located thereon, specifically the stacked body comprising the optical waveguide layer 17, second conductivity-type cladding layer 15, first conductivity-type subcladding layer 13, and ohmic contact layer 21. An electrical insulating layer 23, of polyimide or the like, is formed on both sides of this mesa portion 20 and in a region above the first conductivity-type cladding layer 19. The mesa portion 20 is buried in the insulating layer, whereby light is contained or confined in the optical waveguide layer 17 and the electrical field is blocked (FIG. 1(B)).

Figure 2A:
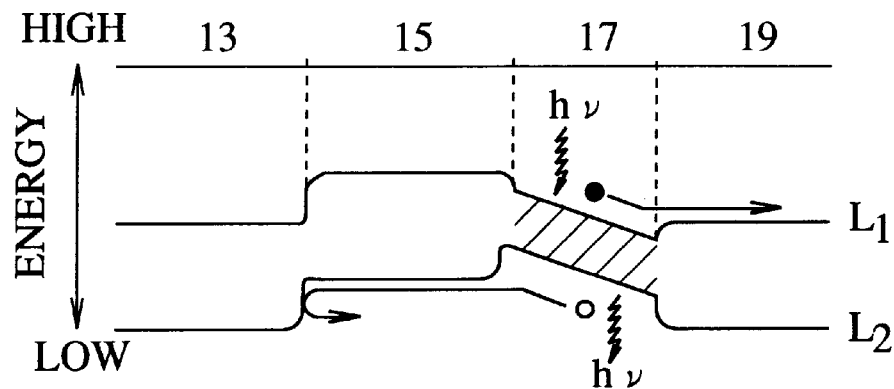
FIGS. 2(A)–2(C) are energy diagrams for explaining the first embodiment.
Figure 2B:
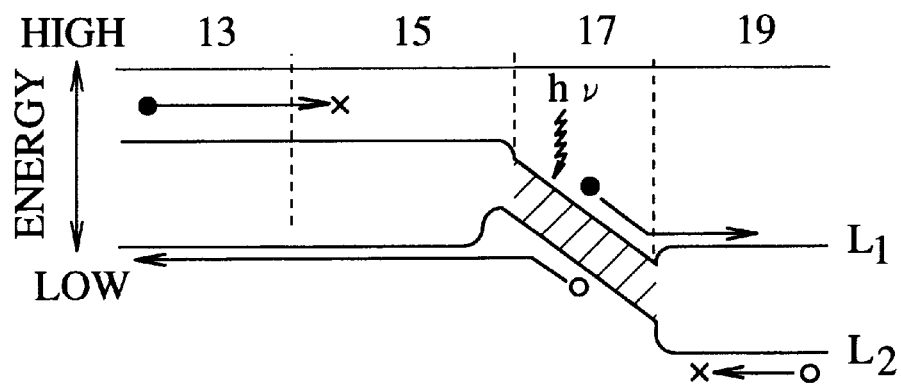
Figure 2C:
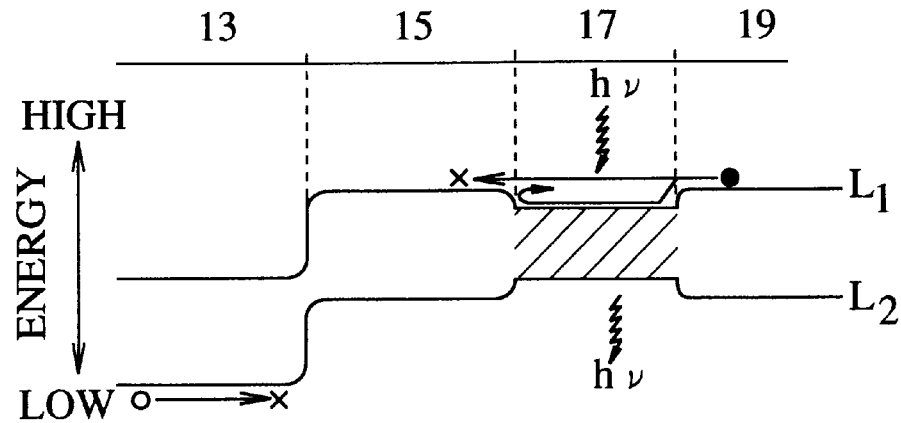

The operation of this semiconductor optical modulator device will be explained. FIG. 2 is an energy diagram for explaining the operation of the semiconductor optical modulator device having the structure shown in FIG. 1(A). Also, the horizontal axis in FIGS. 2(A), 2(B), and 2(C) shows each region of the mesa portion in order; the vertical axis shows the energy levels (relative value).

FIGS. 2(A), 2(B), and 2(C) show the energy levels during the following times for the following regions, respectively: the times of thermal equilibrium (FIG. 2(A)), reverse bias application (FIG. 2(B)), and, forward bias application (FIG. 2(C)), and the regions of the first conductivity-type subcladding layer 13, the second conductivity-type cladding layer 15, the optical waveguide layer 17, and the first conductivity-type cladding layer 19. The upper line $L_1$ shows the conduction band energy; the lower line $L_2$ shows the valence band energy. The black circles in the figure show electrons and the white circles show holes (positive holes); the arrow shows a flow direction of each of electrons and holes due to the biased voltage.

During thermal equilibrium (FIG. 2(A)), the built in voltage is applied to the optical waveguide layer. Thereby, the incident light (hv) from outside is slightly absorbed and other light is transmitted. The absorbed light creates the electrons and holes (positive holes) inside the optical waveguide layer 17; the electrons diffuse into the first conductivity-type cladding layer 19 and the holes diffuse into the second conductivity-type cladding layer 15. However, the holes are prevented from moving into the first conductivity-type subcladding layer 13 by the energy barrier formed between the second conductivity-type cladding layer 15 and the first conductivity-type subcladding layer 13. As a result, holes accumulate in the valence band in the optical waveguide layer 17 and there is no light absorption.

In the case of applying reverse voltage to the double heterojunction structure (FIG. 2(B)), the optical waveguide layer 17 absorbs incident light (hv) from outside due to the electroabsorption effects and many holes and electrons are created. At this time, the homojunction portion of the first conductivity-type subcladding layer 13 and the second conductivity-type subcladding layer 15 is put in forward bias. For this reason, the energy barrier in this section disappears and the holes flow toward the first conductivity-type subcladding layer 13 without being accumulated; the electrons flow to the second conductivity-type cladding layer 15. Light absorption can thereby be effected continuously. Also, the second conductivity-type cladding layer 15 is a layer with the sufficient thickness of 1 $\mu$m and a high carrier concentration of $5 \times 10^{17}$ cm$^{-3}$. When the double heterojunction structure is put in reverse bias, electrons flow from the first conductivity-type subcladding layer 13 to the second conductivity-type cladding layer 15, but the holes in the second conductivity-type cladding layer 15 combine with the inflowing electrons and are thereby reduced in number (shown with an X in the figure.). For this reason, the flow of electrons from the second conductivity-type cladding layer 15 to the optical waveguide layer 17 can be suppressed. Consequently, the only carriers in the optical waveguide layer 17 are those generated by the absorption of incident light from outside.

In this way, because the first conductivity-type subcladding layer is newly added, the semiconductor optical modulator device has no influence on the semiconductor optical modulation properties attained by the reverse voltage application. Also, when forward voltage is applied to the double heterojunction structure, this carrier with the first type of conductivity is captured by the carrier with the second type of conductivity within the second conductivity-type cladding layer, even in the event that a carrier with the first type of conductivity moves from the first conductivity-type cladding layer due to diffusion; and there is therefore no concern regarding current flowing into this semiconductor optical modulator device. Therefore, the transistor-like, current amplifying action of this device is sufficiently suppressed and it is possible to realize the ideal electrical-to-optical or optical-to-electrical conversion operation with the optical waveguide layer 17.

In the case of applying forward voltage to the double heterojunction structure (FIG. 2(C)), reverse voltage is not applied to the optical waveguide 17, whereby there is little or no absorption of light entering therein from outside. For this reason, the generation of ASE and Joule heat can be suppressed. At this time, a high energy barrier is formed because the homojunction portion between the first conductivity-type subcladding layer 13 and the second conductivity-type cladding layer 15 is put in reverse bias. This energy barrier can prevent the flow of holes from the first conductivity-type subcladding layer 13 to the second conductivity-type cladding layer 15, and consequently to the optical waveguide layer 17. The electrons moving from the first conductivity-type cladding layer 19 through the optical waveguide layer 17 toward the second conductivity-type cladding layer 15 are blocked by the energy barrier at the heterojunction of the optical waveguide layer 17 and the second conductivity-type cladding layer 15. However, this energy barrier can be moved over by the electrons if the forward voltage is slightly increased. As discussed above, the second conductivity-type cladding layer 15 is a layer wherein the thickness and carrier concentration are established so as to suppress the flow of electrons from the second conductivity-type cladding layer 15 to the first conductivity-type subcladding layer 13, due to the combination of the holes in the second conductivity-type cladding layer 15 with the injected electrons. For this reason, the holes of the second conductivity-type cladding layer 15 and electrons flowing from the first conductivity-type subcdadding layer 13 combine and their numbers are reduced, thereby suppressing the flow of electrons to the optical waveguide layer 17. Consequently, because the carrier does not flow to the optical waveguide layer 17, ASE generation can be prevented without emission and recombination.

At this time, the carrier flow in the double heterojunction is prevented. Because the carrier flow into the optical waveguide layer is thereby reduced, the presence of the carrier accumulated in the optical waveguide layer does not become a factor in changing the index of refraction of the optical waveguide layer. The increase of the $\alpha$ parameter can be prevented because there is reduction of the phase modulation of the carrier frequency.

Also, the high frequency response characteristics can be maintained because the capacitance of the double heterojunction structure is not made large.

Figure 3A:
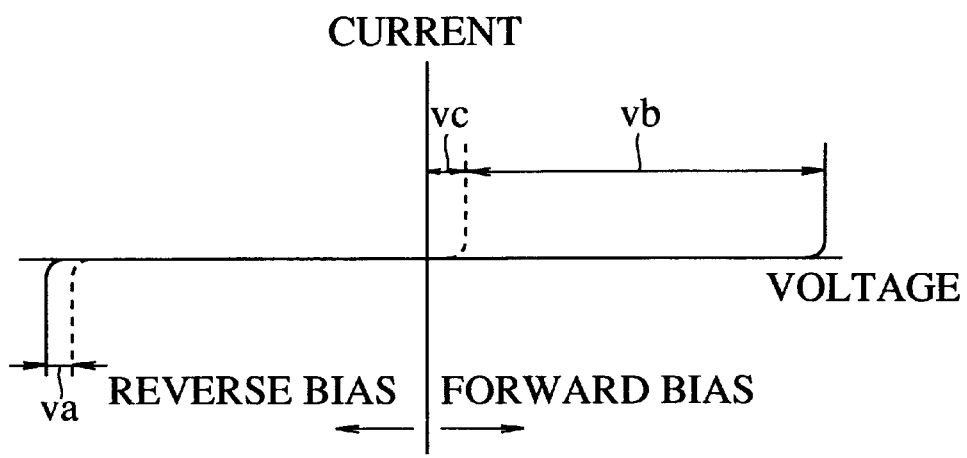
FIG. 3(A) is a diagram of the current-voltage properties of the device relating to the first and fifth embodiments.
Figure 3B:
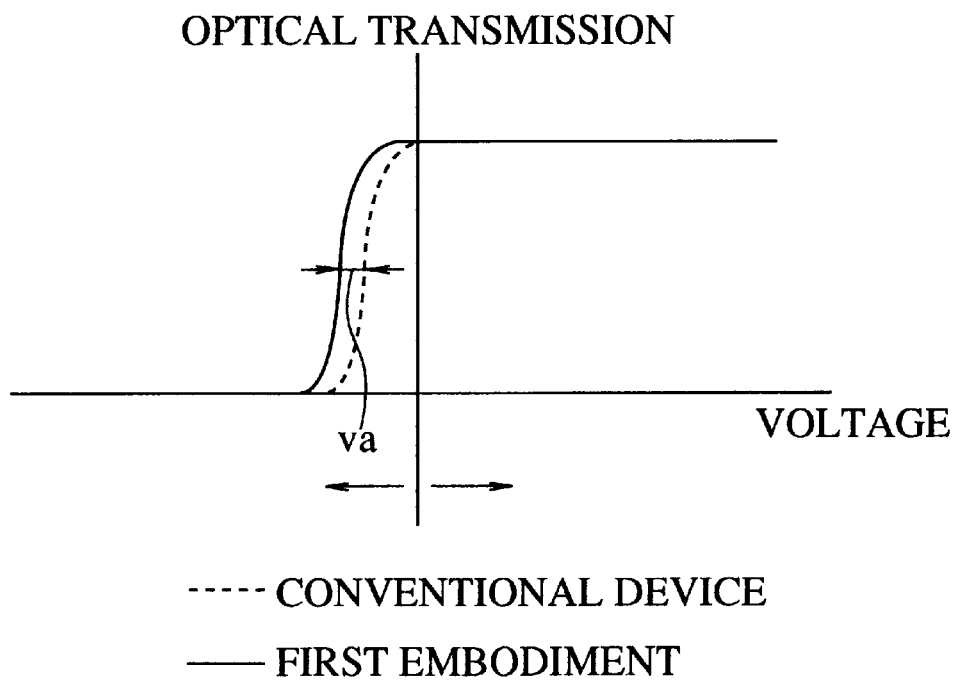
FIG. 3(B) is a diagram of the voltage-light propagation properties of the device relating to the first and fifth embodiments.

Because of the foregoing, the extinction properties and current voltage properties of the semiconductor optical modulator device are as shown in FIGS. 3(A) and 3(B). FIG. 3(A) shows the current voltage properties; FIG. 3(B) is a diagram of the voltage-opticaltransmission properties, showing the extinction properties. In FIG. 3(A), the horizontal axis shows the voltage and the vertical axis shows current in arbitrary units. Also, FIG. 3(B) shows voltage in arbitrary units on the horizontal axis and the optical transmission rate on the vertical axis.

In the figures, the curve shown with a dotted line represents the properties of a conventional semiconductor optical modulator device and the curve shown with the solid line represents the properties of the semiconductor optical modulator device of the present embodiment.

With reference to FIG. 3(A), breakdown voltage shifts toward reverse bias at only the built-in voltage va of the homojunction of the first conductivity-type subcladding layer 13 and the second conductivity-type cladding layer 15, in the voltage region where reverse voltage is applied to the double heterojunction structure, which is the usual operating region of the electroabsorption semiconductor optical modulator device. With reference to FIG. 2(B), voltage in this voltage region, at which the desired light absorption is attained, shifts toward reverse bias at only the built-in voltage va of the homojunction. This built in voltage va is about 0.7 V and the same electroabsorption effects as in a conventional semiconductor optical modulator device are attained.

In the voltage region where forward voltage is applied to the double heterojunction structure, the voltage, corresponding to the sum of the reverse withstand voltage vb of the homojunction of the first conductivity-type subcladding layer 13 and the second conductivity-type cladding layer 15 and the built-in voltage vc of the double heterojunction structure, can be made so that current does not flow in the device (FIG. 3(A)). This reverse withstand voltage vb of the homojunction is shown as the high value of 10–20 V. Also, as shown in FIG. 3(B), incident light from outside is output without modulation of the index or refraction or of intensity in this region. This suggests that, since current does not flow when forward voltage is applied, carriers do not flow into the optical waveguide layer and those carriers do not accumulate in the optical waveguide layer, as in FIGS. 3(A) and (B). This also means that emission and recombination in the optical waveguide layer can be prevented.

The same effects as those relating to the semiconductor optical modulator device with the structure shown in FIG. 1(A) are attained with the semiconductor optical modulator device having the structure shown in FIG. 1(B). Also, the same effects are attained even for a device wherein the first type of conductivity is p-type and the second type of conductivity is n-type.

Second Embodiment

Figure 4A:
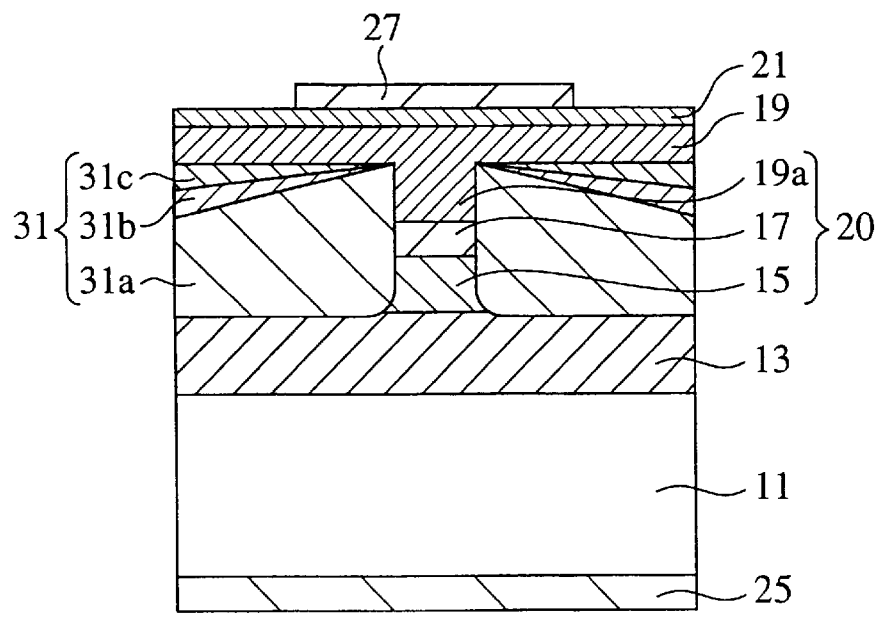
FIG. 4(A) is a cross-sectional view showing the structure of a semiconductor optical modulator device relating to the second embodiment of the present invention.
Figure 4B:
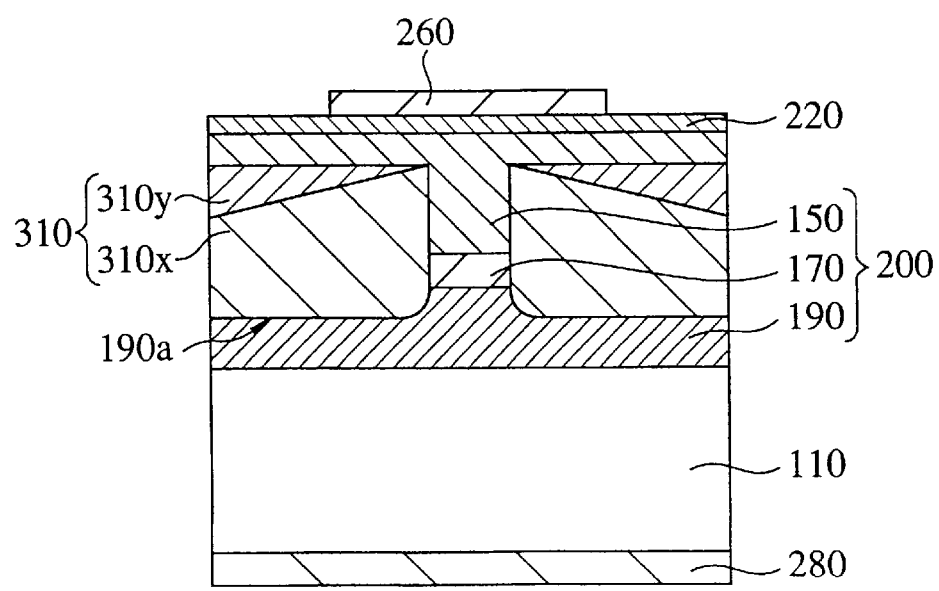
FIG. 4(B) is a cross-sectional view showing the structure of a semiconductor optical modulator device relating to a semiconductor optical modulator device with a conventional BH-type structure.

With reference to drawings, the second embodiment will be explained with an example wherein the semiconductor optical modulator device according to the present invention is applied to a semiconductor optical modulator device of a BH-type (buried hetero structure), in effect, of a buried structure. FIG. 4(A) is a cross-sectional view showing the semiconductor optical modulator device of the present embodiment, and FIG. 4(B) is a cross-sectional view showing a conventional BH-type semiconductor optical modulator device.

With reference to FIG. 4(A), constructional features different from those of the first embodiment will be explained, and a detailed explanation about constructional features identical to the first embodiment will be omitted.

A semiconductor optical modulator device of the second embodiment has the following structure. The optical waveguide layer 17 and second conductivity-type cladding layer 15 of the double heterojunction structure are buried in a current blocking layer 31. The current blocking layer 31 comprises a second conductivity-type first blocking layer 31*a*, a first conductivity-type blocking layer 31*b*, and a second conductivity-type second blocking layer 31*c*, in that order downwards through the device. The current blocking layer 31 is established on at least both sides of the optical waveguide layer 17 and second conductivity-type cladding layer 15.

In this example, the first type of conductivity is n-type and the second type of conductivity is p-type.

As shown in FIG. 4(A), the first conductivity-type subcladding layer 13, second conductivity-type cladding layer 15, optical waveguide layer 17, and first conductivity-type cladding layer 19 are layered or stacked in that order on the underlying layer 11 of the first conductivity-type. Part of the second conductivity-type cladding layer 15, optical waveguide layer 17, and first conductivity-type cladding layer 19 is buried in the current blocking layer 31. In the current blocking layer 31, a second conductivity-type first blocking layer 31*a* and a first conductivity-type blocking layer 31*b* above the second conductivity-type first blocking layer 31*a* are established in the area on both sides of the second conductivity-type cladding layer 15 and above the first conductivity-type subcladding layer 13; a second conductivity-type second blocking layer 31*c* is established on the first conductivity-type blocking layer 31*b*. Also, the second conductivity-type first blocking layer 31*a* contacts both sides of the mesa portion 20 comprising part 19*a* of the first conductivity-type cladding layer 19, optical waveguide layer 17, and second conductivity-type cladding layer 15.

As in the first embodiment, an ohmic contact layer 21 of a first conductivity-type and electrode 27, on the ohmic contact layer 21, are formed on the upper side of the first conductivity-type cladding layer 19. An electrode 25 is formed on the lower side of the underlying layer 11.

Meanwhile, in the structure of a conventional BH-type semiconductor optical modulator device as shown in FIG. 4(B) the n-type cladding layer 190, optical waveguide layer 170, and n-type cladding layer 150 are layered or stacked in that order on the n⁺ substrate 110. Part of the optical waveguide layer 170, n-type cladding layer 190, and p-type cladding layer 150 form a mesa structure 200, which is buried in the current blocking layer 310. The current blocking layer 310 comprises a p-type blocking layer 310*x* and an n-type blocking layer 310*y*, stacked in that order on the n-type cladding layer 190. A p-type ohmic contact layer 220 is established on the p-type cladding layer 150; on this p-type ohmic contact layer 220, an electrode 260 is established on the p-type side and an n-type electrode 280 is established on the lower surface of the n⁺ substrate 110.

When reverse voltage is applied to the double heterojunction structure in this conventional device, the interface 190*a* of the n-type cladding layer 190 and the p-type blocking layer 310*x* is put in reverse bias; as a result, an energy barrier is formed in this interface 190*a* and current is prevented from leaking from both sides of the mesa structure 200. However, when forward voltage is applied to the double heterojunction structure, this interface 190*a* is put in forward bias, reducing the energy barrier and allowing major current leakage.

In the semiconductor optical modulator device of the present embodiment shown in FIG. 4(A), a current blocking layer 31 is provided on both sides of the mesa portion 20 including the optical waveguide layer 17. As a result, an np-type homojunction is formed by the first conductivity-type subcladding layer 13 and second conductivity-type first blocking layer 31*a*; and a pn-type homojunction is formed by the second conductivity-type first blocking layer 31*a* and first conductivity-type cladding layer 19. When reverse or forward voltage is applied to the double heterojunction structure, the energy barrier of either of the homojunctions is increased and can prevent current leaking from both sides of the mesa portion.

As a result, the same results as the first embodiment are attained; furthermore, it is possible to apply higher voltages because current leakage can be made small. Also, the regulation of impedance can be maintained up to high frequency regions.

In the structure of the semiconductor optical modulator device in the second embodiment, the order of the layers on the underlying layer may also be as follows: first conductivity-type cladding layer, optical waveguide layer, second conductivity-type cladding layer, first conductivity-type subcladding layer, and ohmic contact layer.

Also the first type of conductivity may be p-type and the second type of conductivity may be n-type.

Third Embodiment

Figure 5:
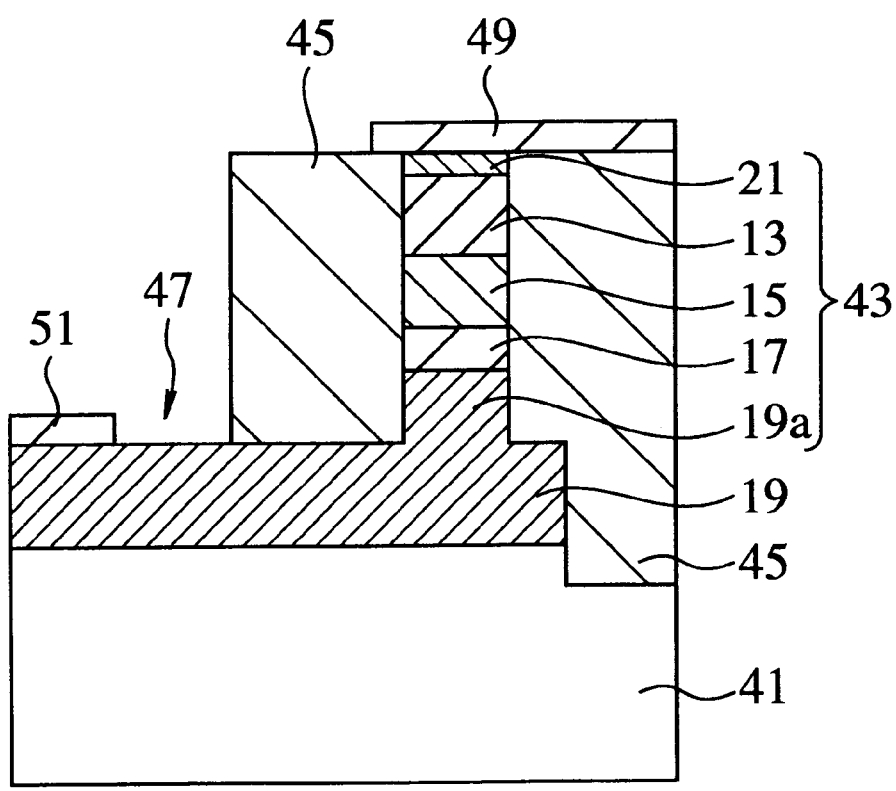
FIG. 5 is a cross-sectional view showing an example of the structure of a semiconductor optical modulator device relating to the third embodiment of the present invention.

With reference to a drawing, the third embodiment will be explained with an example of a semiconductor optical modulator device structure according to the present invention wherein electrodes are arranged in a flat manner. FIG. 5 is a structural diagram showing the cross section taken perpendicular to photoconduction by the semiconductor optical modulator device in the present embodiment.

The aspects which are different from the first embodiment will be explained; a detailed explanation of those aspects which are identical to the first embodiment will be omitted.

The semiconductor optical modulator device of the present embodiment has a structure in which the first conductivity-type subcladding layer 13 is provided on the underlying layer 41 with the double heterojunction structure interposed between the layers 13 and 41. First and second electrodes are established on the upper side of the device. In other words, a first electrode 49 is established on the side of the first conductivity-type subcladding layer 13 opposite from the double heterojunction structure; and a second electrode 51, electrically connected to the first conductivity-type cladding layer 19, is established on the same side as the first electrode.

The first type of conductivity of this semiconductor optical modulator device is n-type and the second type of conductivity is p-type. Alternately, the first conductivity-type subcladding layer may also be established between the underlying layer and the double heterojunction structure, as in the first embodiment. The same effects as attained with the first embodiment are thereby attained.

In the structure shown in FIG. 5, the first conductivity-type cladding layer 19, optical waveguide layer 17, second conductivity-type cladding layer 15, and first conductivity-type subcdadding layer 13 are layered or stacked in that order on the semi-insulating substrate 41. An ohmic contact layer 21 of the first conductivity-type is formed on the upper surface of the first conductivity-type subcladding layer 13. A mesa portion 43 is formed by the ohmic contact layer 21, first conductivity-type subcladding layer 13, second conductivity-type cladding-layer 15, optical waveguide layer 17, and part 19a of first conductivity-type cladding layer 19. On both sides of this mesa portion 43 is provided a layer 45 (electrical insulating layer) comprising an insulating material on the first conductivity-type cladding layer 19. A throughhole 47, exposing part of the surface of the first conductivity-type cladding layer 19, is formed in this electrical insulating layer 45. An n-type electrode, which is the first electrode 49, is formed on the upper surface of the ohmic contact layer 21 of the mesa portion 43; an n-type electrode, as the second electrode 51, is formed on the exposed surface of the first conductivity-type cladding layer 19. In this way, the first and second electrodes 49 and 51 are established on surfaces on the same side of the semiconductor optical modulator device.

Designing the first electrode 49 and second electrode 51 to be at such positions, electrode capacity can be reduced because the distance between the electrodes can be made long in comparison with a structure wherein the electrodes are formed on opposite sides, as seen from the direction in which the above mentioned layers are stacked, like in the first embodiment. The high frequency characteristics can therefore be improved.

In the production of the semiconductor optical modulator device of the present embodiment, the first electrode 49 and second electrode 51 may be formed by the same process and at the same time.

In this embodiment, a mask is established, exposing at least the region on the ohmic contact layer 21 of the mesa portion 43 and the region of the surface of the first conductivity-type cladding layer 19; the first and second electrodes (49 and 51) are formed by the deposition of Ti/Pt/Au (in order from the bottom: Ti, Pt, Au), for example.

Meanwhile, a flat electrode arrangement can also be introduced to an optical modulator having a conventional double heterojunction structure. However, conventional electrodes corresponding to the first and second electrodes in the present embodiment have different types of conductivity. For example, if the first electrode is a p-type electrode, then the second electrode is an n-type electrode. It is therefore difficult to form the two conventional electrodes with the same process. Even when the two conventional electrodes are formed on respectively opposite surface of the device as in the first embodiment, it is difficult to form them at the same time.

Consequently, in the present embodiment, the process for forming electrodes on the semiconductor optical modulator device is made more simple than the conventional process and the number of steps of the process can be reduced. A reduction of the manufacturing costs of the semiconductor optical modulator device can thereby be anticipated.

Also, the structure of the semiconductor optical modulator device of the third embodiment Ls not limited to the aforementioned structure, so long as the second electrode is electrically connected to the first conductivity-type cladding layer.

Also, the first type of conductivity may be p-type and the second type of conductivity may be n-type.

Fourth Embodiment

With reference to the drawings, the fourth embodiment will be explained, in which the semiconductor optical modulator device comprises a rectifying element, such as a diode, combined with an optical modulator with a conventional double heterojunction structure. FIG. 6 is a diagram showing the structure of the semiconductor optical modulator device of the present embodiment.

The semiconductor optical modulator device in this embodiment is provided a double heterojunction structure comprising a first conductivity-type cladding layer, optical waveguide layer, and second conductivity-type cladding layer on an underlying layer. In addition thereto, the semiconductor optical modulator device is provided a rectifying element comprising a first conductivity-type layer and a second conductivity-type layer. The second conductivity-type layer is electrically connected to the second conductivity-type cladding layer.

Here, for example, the first type of conductivity is n-type, the second type of conductivity is p-type, and the underlying layer is an n-type substrate.

Figure 6A:
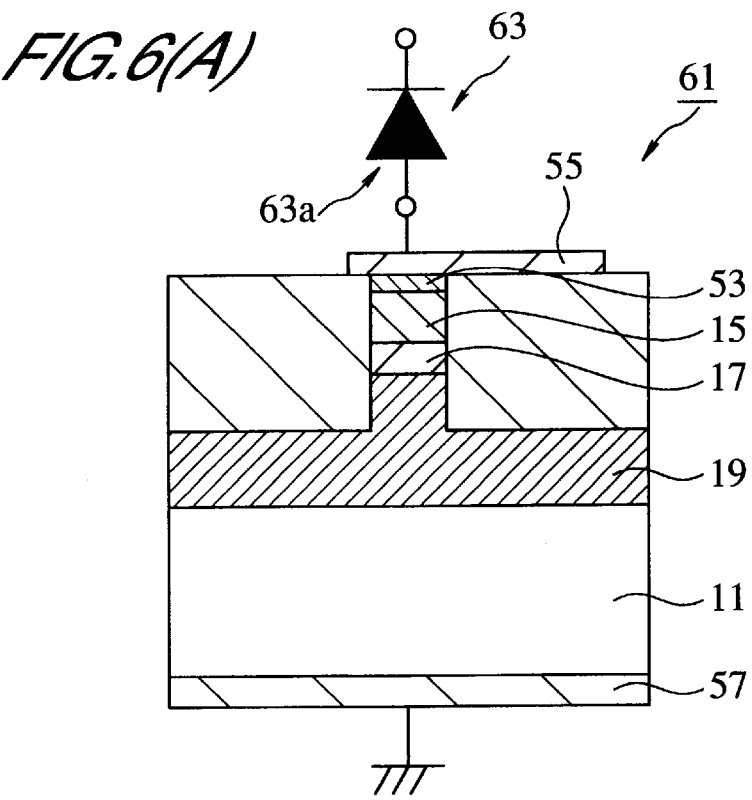
FIG. 6(A) and FIG. 6(B) are diagrams showing the structure of a semiconductor optical modulator device relating to the fourth embodiment of the present invention.

As shown in FIG. 6(A), the semiconductor optical modulator device has a double heterojunction structure comprising a first conductivity-type cladding layer 19, optical waveguide layer 17, and second conductivity-type cladding layer 15 established in that order on the underlying layer 11. A second conductivity-type ohmic contact layer 53 is formed on the second conductivity-type cladding layer 15. A second conductivity-type electrode 55 is established on the second conductivity-type ohmic contact layer 53. A first conductivity-type electrode 57 is established on the bottom side of the underlying layer. An optical modulator 61 with such a structure is provided a rectifying element 63 comprising a first conductivity-type layer and second conductivity-type layer.

The second conductivity-type layer is electrically connected to the second conductivity-type cladding layer 15.

The rectifying element 63 is, for example, a pn junction element such as a diode.

Here, the second conductivity-type electrode 63a of the rectifying element 63 is electrically connected to the second conductivity-type electrode 55 formed on the second conductivity-type cladding layer 15 side of the optical modulator.

The n-type layer of the diode can thereby operate as a layer with substantially the same role as the first conductivity-type (n-type) subcladding layer 13 as explained in the first embodiment. The same effects as with the first embodiment are thereby attained.

When reverse voltage is applied to the device of the fourth embodiment, the breakdown voltage thereof becomes more negative than −10 V. When forward voltage is applied to the device, the voltage at which current begins to flow (breakdown voltage) can be raised to over 10 V. With the present embodiment, the characteristics of the transmission factor (or transmittance) result in a curve shifted only 0.8 V toward reverse voltage, in the region where reverse voltage is applied to a conventional semiconductor optical modulator device.

In the unlikely event that a strong, forward biased power surge is applied to the semiconductor optical modulator device, it is the inexpensive rectifying element that will be damaged, and accordingly, damage to the expensive optical modulator (double heterojunction structure) can be avoided. For this reason, maintenance costs can be reduced by using the semiconductor optical modulator device in optical telecommunication systems.

Voltage can be applied separately to the rectifying element and double heterojunction structure, thereby making bias regulation easy.

In the aforementioned semiconductor optical modulator device, the ohmic contact layer, on which the electrode is established, becomes the first conductivity-type when the first type of conductivity is n-type. For this reason, the ohmic contact resistance value can be reduced to one-tenth the resistance value of a second conductivity-type ohmic contact layer.

The ohmic contact layer and double heterojunction structure are serially connected; therefore, when the resistance value of the ohmic contact layer is great, voltage drops in that portion and the voltage applied to the double heterojunction structure is reduced.

Because the ohmic contact layer in this instance can be a first conductivity-type, the voltage applied to the double heterojunction structure can be raised and as a result, the frequency response characteristics can be improved.

When the first type of conductivity is n-type, the ohmic contact layer is established on the first conductivity-type layer. Because the first conductivity-type layer has lower resistance value than a second conductivity-type layer, an electrode can be formed without necessarily providing an ohmic contact layer. Because of its high light absorption characteristics, the ohmic contact layer would likely absorb the guided light. However, when an ohmic contact layer is not established, the absorption of guided light can be reduced.

The temperature of heat treatment, when an electrode is established on an ohmic contact layer, can be kept lower than when established on a second conductivity-type layer. Also, the tolerance for the time required for heat treatment can be relaxed. Reproducibility can thereby be improved and heat damage to the device can be reduced.

Figure 6B:
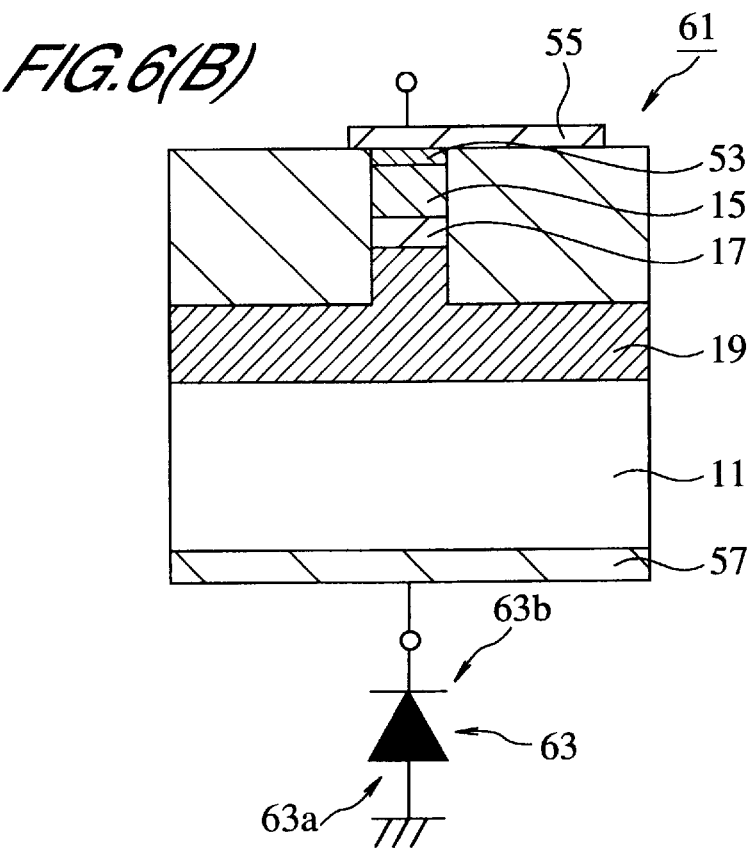

In the semiconductor optical modulator device of the present embodiment, a first conductivity-type electrode 57 of the optical modulator 61 and a first conductivity-type electrode 63b of the rectifying element 63 may be connected as shown in FIG. 6(B) At this time, the second conductivity-type layer of the rectifying element 63 plays substantially the same role as the first conductivity-type subcladding layer, where the first type of conductivity is p-type and the second type of conductivity is n-type, as in the first embodiment. The same effects as those mentioned above are attained with this structure of the fourth embodiment.

As is apparent from the preceding explanation of the first through fourth embodiments, the semiconductor optical functional element according to the present invention is provided on an underlying layer a double heterojunction structure formed comprising a first conductivity-type cladding layer, optical waveguide layer, and second conductivity-type cladding layer. Furthermore, the element of the present invention is provided a first conductivity-type subcladding layer forming a homojunction with the surface of the second conductivity-type cladding layer opposite to the optical waveguide layer.

As a result, even when mark side voltage of an electrical signal applied to the semiconductor optical modulator device is set to such a voltage within a voltage region that forward voltage is applied to the double heterojunction structure, the value of the a parameter on the mark side can be clipped at a value close to the value when voltage is not applied (0 V).

At this time, the frequency response characteristics on the mark side can also be sustained under conditions of thermal equilibrium.

At this time, ASE generation can be suppressed because the device can be constituted so that current does not leak in the device.

Consequently, the quality of light propagation in this device can be markedly improved. As a result, great improvements in the nature of optical telecommunications systems can be expected.

Also, because the generation of Joule heat can be suppressed when forward voltage is applied to the double heterojunction structure, heat discharge design for the device becomes easy and the realization of cooler-less mounting is expected.

Even when a surge voltage due to a forward bias is applied to the double heterojunction structure, application of the surge voltage to the double heterojunction structure can be avoided if the surge voltage is lower than a voltage corresponding to the sum of the reverse withstand voltage of the p-n junction of 10 to 20 V and the built in voltage of the double heterojunction structure of 0.7 to 0.8 V. It is thereby possible to provide a semiconductor optical modulator device having superior resistance to surges to a conventional one.

As is apparent from the explanation of the first through fourth embodiments, in the semiconductor optical functional element according to the present invention, the ohmic contact layer on which electrodes are provided become n-type when the first type of conductivity is n-type. For this reason, the ohmic contact resistance value can be reduced to one-tenth the resistance value of a p-type ohmic contact layer.

Because the ohmic contact layer and double heterojunction structure are serially connected, when the resistance of the ohmic contact layer is high, a voltage drop occurs at that portion and the voltage applied to the double heterojunction structure decreases.

The voltage applied to the double heterojunction structure can be raised because the ohmic contact layer can be n-type; as a result, the frequency response characteristics can be improved.

When the first type of conductivity is n-type, an ohmic contact layer is established on this n-type layer. Because the n-type layer has lower resistance value than that of a p-type layer, an electrode can be formed thereon without an ohmic contact. Because of its high light absorption characteristics, the ohmic contact layer would likely absorb the guided light. However, when an ohmic contact layer is not established, the absorption of guided light can be reduced.

The temperature of heat treatment, when an electrode is established on an ohmic contact layer, can be kept lower than when established on a second conductivity-type layer. Also, the tolerance for the time required for heat treatment can be relaxed. Reproducibility can thereby be improved and heat damage to the device can be reduced.

In the first through fourth embodiments, InP was used as the semiconductor material in the semiconductor optical functional element according to the present invention. The semiconductor material is not limited thereto and GaAs or the like material may also be used. The optical waveguide layer used in the present invention is not limited to an undoped layer. An i-type layer or conductive-type layer may be used as the optical waveguide layer, if the effects of the present invention can be attained by the use of such a layer. Also, the optical waveguide layer is a layer comprising InGaAsP crystal, in the first through fourth embodiments, but is not limited thereto and may be an optical waveguide layer with a quantum well structure or a lattice strain structure. Also, the first through fourth embodiments of the present invention were explained using the example of an electroabsorption optical intensity modulator, but the present invention can also be applied to optical intensity modulators to be used as structural elements in optical phase modulators or Mach-Zehnder interferometers. The present invention can also be applied to devices integrating therein waveguide semiconductor optical elements, such as electroabsorption optical modulators, phase modulators, Mach-Zehnder optical intensity modulators, semiconductor lasers, and the like.

In the first embodiment, the bottom surface of the electrical insulating layer is within the second conductivity-type cladding layer. The structure is not limited thereto and the bottom surface may reside within any layer of the double heterojunction structure so long as the field blocking and light containment or confinement effects are attained. A semiconductor layer of the second conductivity-type, an i-type layer (intrinsic layer), or semi-insulating semiconductor layer may also be used for the electrical insulating layer wherein the mesa portion is buried.

Among the first blocking layer of the second conductivity-type, the blocking layer of the first conductivity-type, and the second blocking layer of the second conductivity-type in the second embodiment, only the first blocking layer of the second conductivity-type is a layer whereby the effects of the present embodiment are attained. The other two layers are necessary because they are layers having the same operation or function as that of layers introduced for forming a pnpn junction by the usual BH-type structure. In the second embodiment, the first blocking layer with the second conductivity-type is a p-type layer, but may also be an undoped layer or a semi-insulating layer.

[II] Next, the present invention relating to the third and fourth aspects will be explained by way of example of an electroabsorption optical modulator.

Fifth Embodiment

Figure 7:
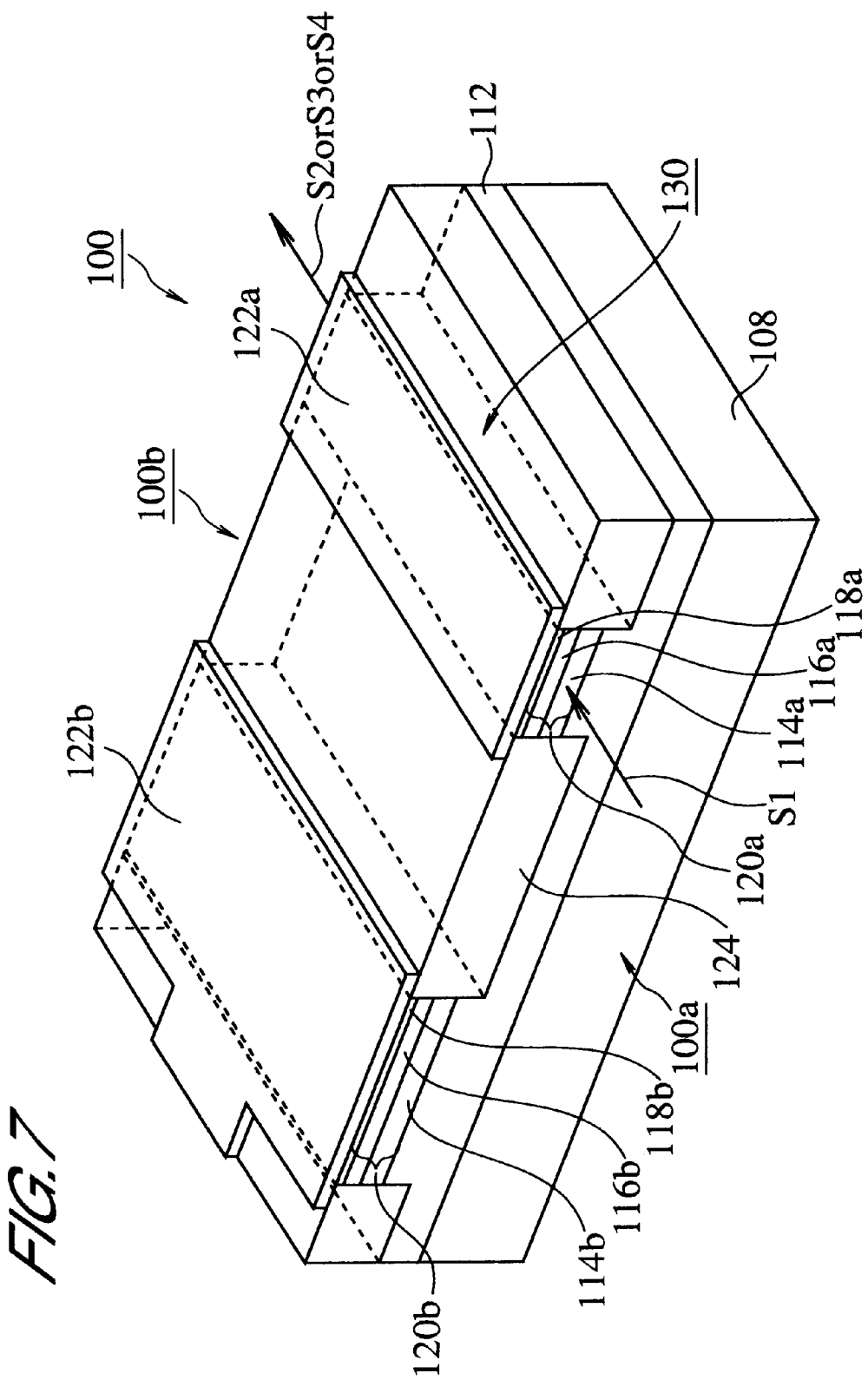
FIG. 7 is a perspective view showing the constitution of an optical modulator to which the present invention may be applied.
Figure 8:
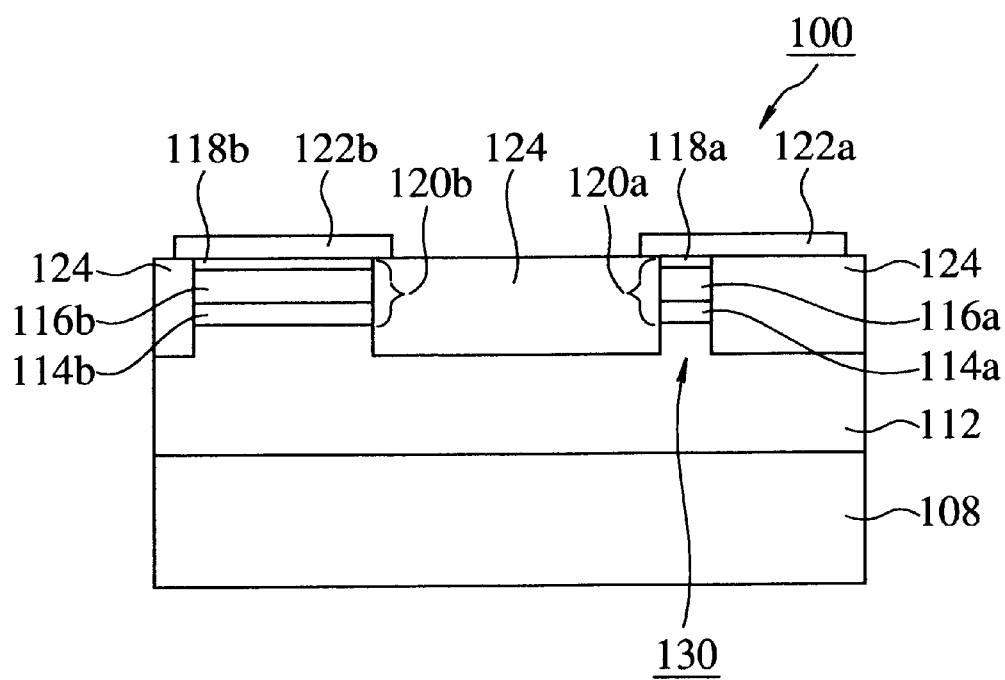
FIG. 8 is a front view showing the constitution of the optical modulator shown in FIG. 7.
Figure 9:
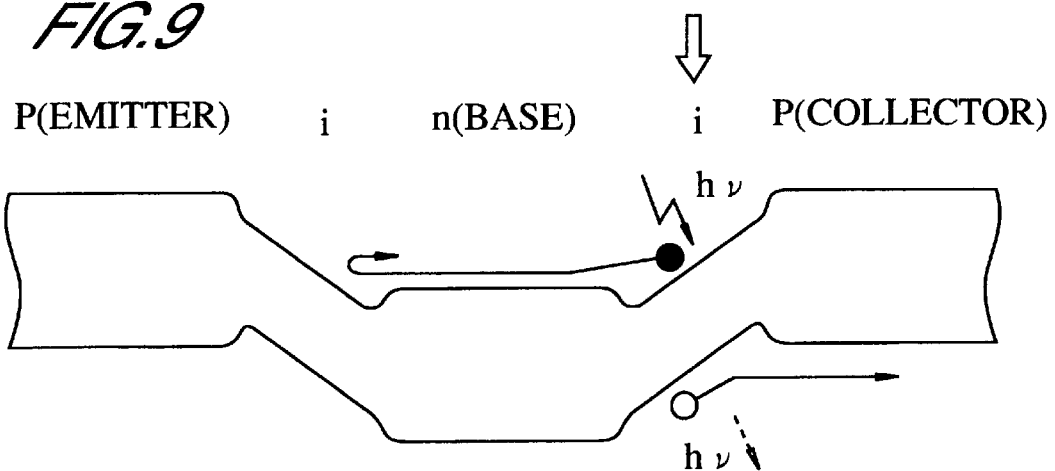
FIG. 9 is an energy diagram for explaining the operation of the optical modulator shown in FIG. 7.
Figure 10:
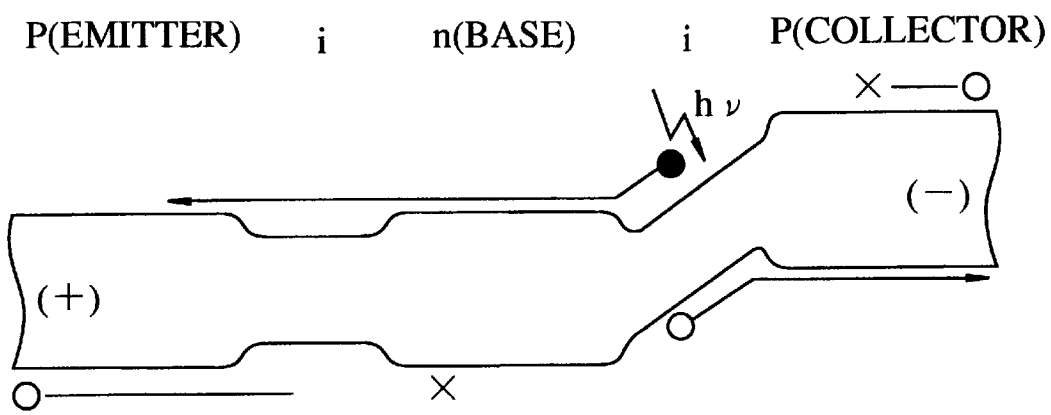
FIG. 10 is another energy diagram for explaining the operation of the optical modulators shown in FIGS. 7 and 15, respectively.
Figure 11:
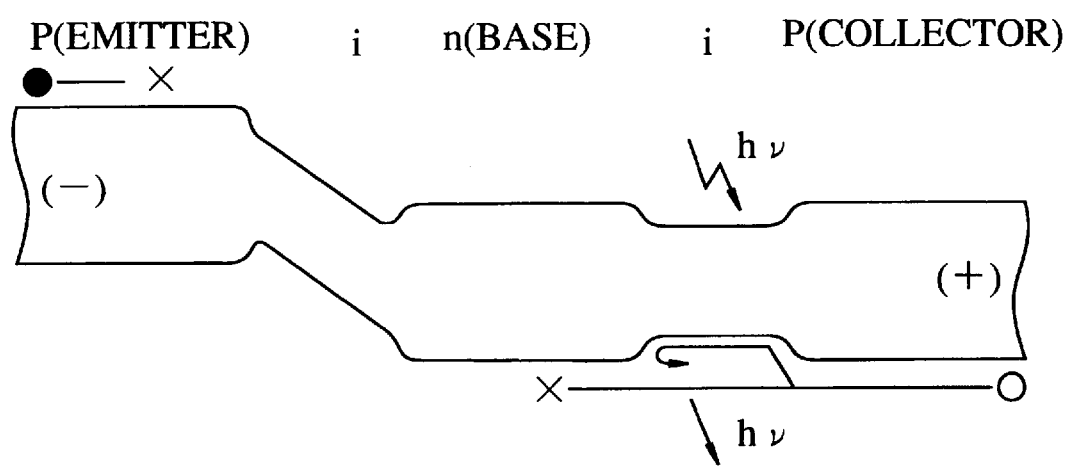
FIG. 11 is still another energy diagram for explaining the operation of the optical modulators shown in FIGS. 7 and 15, respectively.
Figure 12:
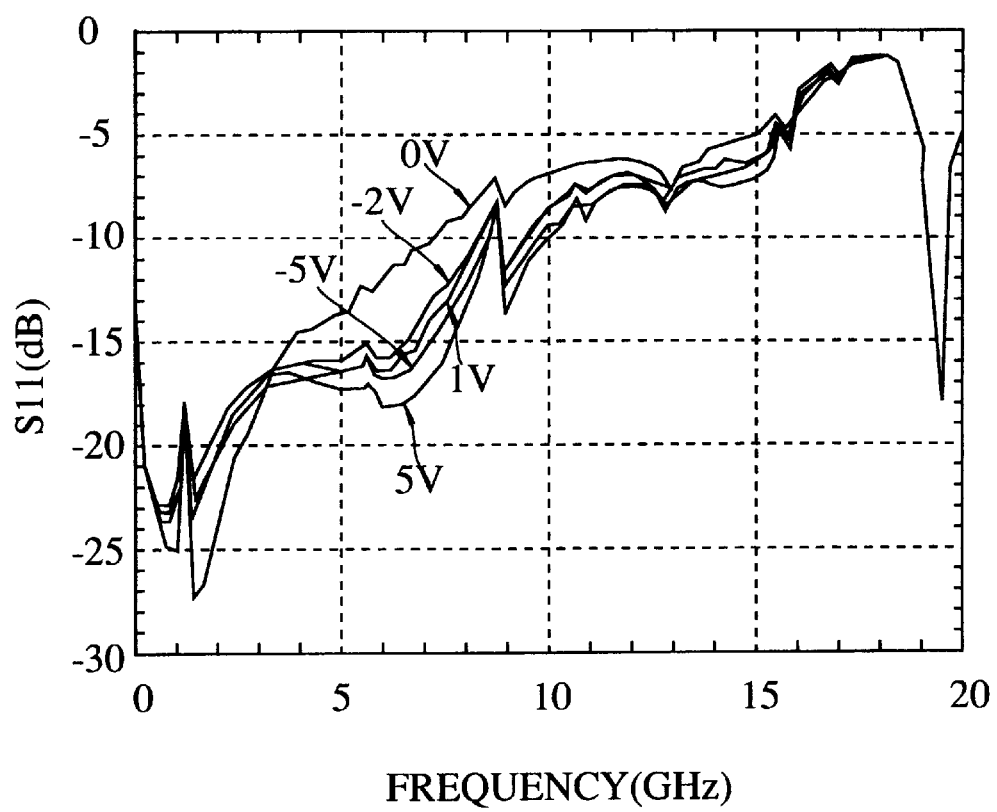
FIG. 12 shows experimental data for another optical modulator to which the present invention can be applied.
Figure 13:
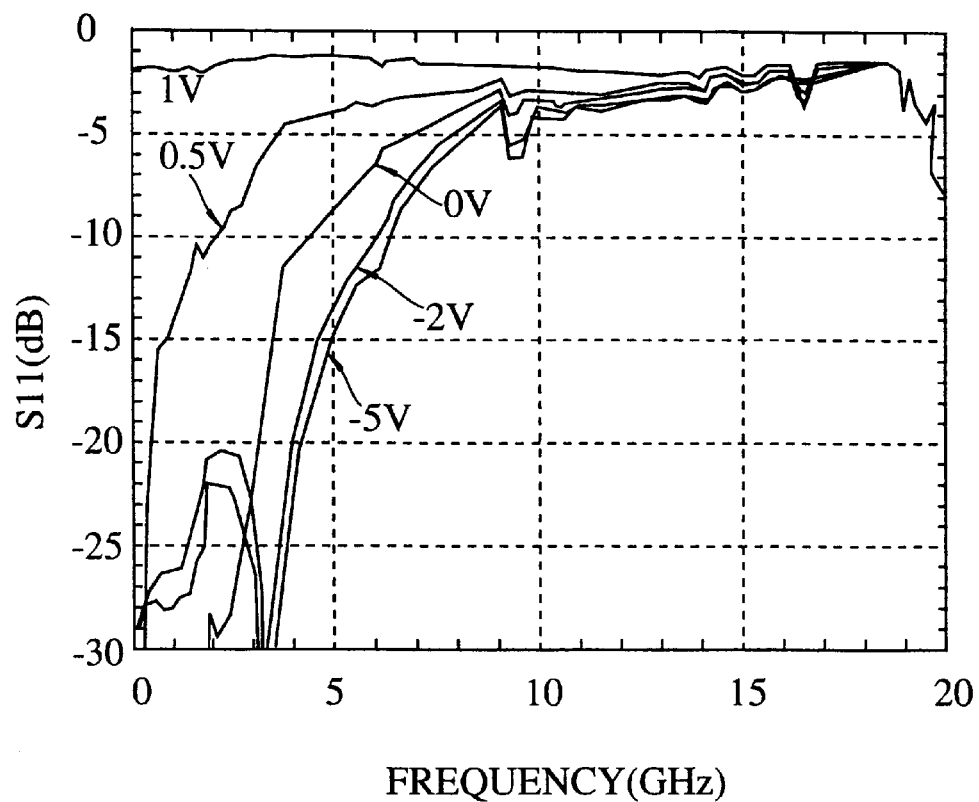
FIG. 13 shows experimental data for a conventional semiconductor optical functional element.
Figure 14:
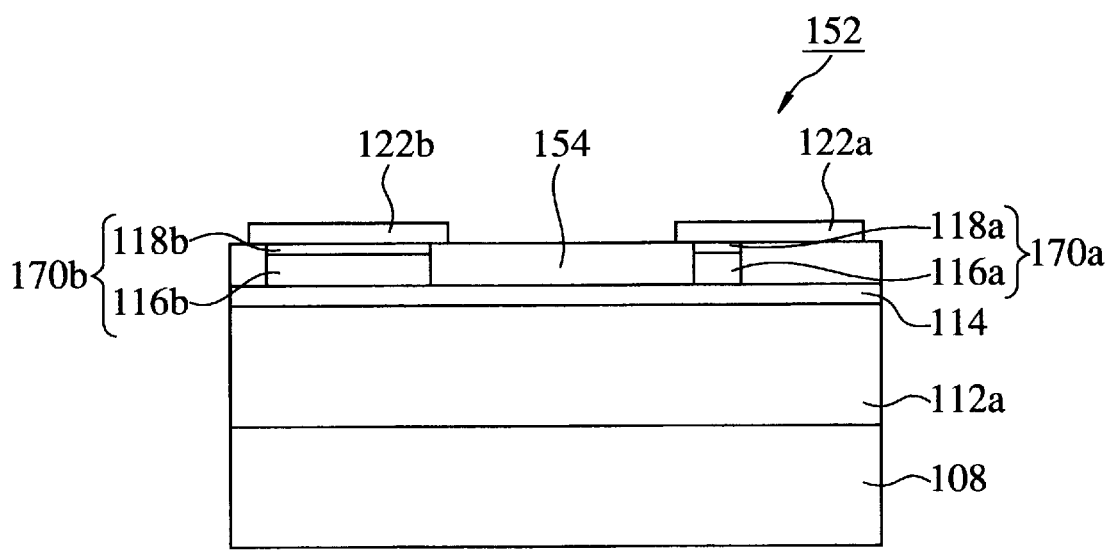
FIG. 14 is a front view showing the constitution of another optical modulator to which the present invention can be applied.

The fifth embodiment of the present invention will be explained with reference to FIGS. 3(A) and 3(B), and FIGS. 7 through 16. FIG. 7 is a perspective view showing the constitution of an optical modulator 100, which is an electroabsorption optical modulator of the present embodiment. FIG. 8 is a front view showing the constitution of the optical modulator 100. FIGS. 9 through 11 are energy diagrams for explaining the operation of the optical modulator 100. Furthermore, FIGS. 12 and 13 show experimental data for an optical modulator according to the present invention having the same basic constitution as the optical modulator 100 and a conventional optical modulator. FIG. 14 is a front view showing the constitution of another optical modulator 150 of the present embodiment.

An optical modulator 100 shown in FIG. 7 is a "one-chip" electroabsorption optical modulator. With this structure, a lower cladding layer 112, comprising n-InP and corresponding to the shared or common cladding layer, is layered or stacked on a semiconductor substrate 108, comprising an n-InP wafer, for example. On the lower cladding layer 112 in the opticalmodulator 100, a first layered or stacked body 120a and a second layered or stacked body 120b respectively having a prescribed structure, both having a striped structure, for example, are formed across a first and second element end surfaces or facets 100a and 100b of the optical modulator 100. The first element end surface 100a opposes to second one 100b.

As shown in FIG. 8, in the first stacked body 120a corresponding to the first semiconductor layer structure, a light absorption layer 114a, comprising undoped InGaAsP, for example, and corresponding to an i-type optical waveguide layer, and an upper cladding layer 116a comprising p-InP, for example, and corresponding to a first separate or individual cladding layer, are stacked in that order on the lower cladding layer 112. A P-i-N heterojunction structure is formed thereby.

Moreover, the composition and structure of the light absorption layer 114a in the first stacked body 120a are formed so that the propagating light is absorbed, only in the case where an electrical field is applied to the light absorption layer, and due to an increase in the light absorption coefficient, corresponding to the imaginary portion of the complex refractive index. Consequently, when an electrical field is not applied to the light absorption layer, the light propagating inside thereof is hardly absorbed. Furthermore, in the first stacked body 120a, an ohmic contact layer 118a, comprising $p^+$-InGaAs, is stacked on the uppermost layer in the P-i-N heterojunction structure, specifically the upper cladding layer 116a. The ohmic contact layer 118a is a structural element corresponding to the first voltage applying means. A first electrode 122a is formed on the upper surface of the ohmic contact layer 118a.

In the second stacked body 120b corresponding to the second semiconductor stacked structure, an intermediate semiconductor layer 114b, comprising undoped InGaAsP, for example, and an upper cladding layer 116b comprising p-InP, for example, and corresponding to a second separate cladding layer, are stacked in that order on the n-type lower cladding layer 112. In the second stacked body 120b, the intermediate semiconductor layer 114b is held between the lower cladding layer 112 and the upper cladding layer 116b;

a P-i-N heterojunction structure is thereby formed. Furthermore, in the second stacked body 120b, an ohmic contact layer 118b, comprising $p^+$-InGaAs and having the second electrode 122b placed in contact with the upper surface, is layered or stacked on the upper cladding layer 116b. The ohmic contact layer 118b is a structural element corresponding to the second voltage applying means.

In the optical modulator 100, the sides of the first stacked body 120a and the second stacked body 120b are buried in Fe-doped InGaAsP, for example, as an electrical insulating material; an insulating layer 124 is formed as a resistive layer. Consequently, electric field blockage and optical containment or confinement in a horizontal or lateral direction are realized with the light absorption layer 114a of the first stacked body 120a; as a result, the optical waveguide 130 in the optical modulator 100 is formed in such a manner to have the light absorption layer 114a as its core.

As explained above, in the optical modulator 100 of the fifth embodiment, a lower cladding layer 112, playing the role of a buffer layer, is interposed between the first electrode 122a and the second electrode 122b, and the two P-i-N heterojunctions therebetween are serially connected through the lower cladding layer 112. Specifically, a P-i-N-i-P heterojunction is formed in the optical modulator 100 by the upper cladding layer 116a of the first stacked body 120a, the light absorption layer 114a of the first stacked body 120a, the lower cladding layer 112, the intermediate semiconductor layer 114b of the second stacked body 120b, and the upper cladding layer 116b of the second stacked body 120b.

Moreover, as shown in FIG. 7, the optical modulator 100 is constituted to suppress the loss of light inputting to and/or outputting from the optical waveguide 130, with a non-reflective film coating the first element end surface 100a and the second element end surface 100b.

The characteristics of the P-i-N-i-P junction structure employed in the optical modulator 100 of the present embodiment will be explained with reference to FIGS. 9–11, 3(A) and 3(B). Moreover, the following explanation concerns the use of this P-i-N-i-P junction as a usual type of P-N-P junction transistor, wherein one P-type region is called a collector, an N-type region is called a base, and another P-type region is called an emitter, so that one can more easily imagine the operation of the P-i-N-i-P junction structure.

First, the situation when the collector side i-type layer transmits light in the P-i-N-i-P, junction structure will be explained with reference to FIGS. 9–11. Moreover, the situation when light passes through the collector side i-type layer in the P-i-N-i-P junction structure changes due to the potential of the collector side and due to the potential of the emitter. Therefore, an explanation will be given separately for each situation.

The first situation is explained using FIG. 9.

The first situation corresponds to one of thermal equilibrium, specifically where voltage is not applied to the emitter side P-type region and the collector side P-type region from outside.

According to the inventors' discovery, a barrier (built-in barrier) due to the built-in potential (diffusion potential) is formed between the emitter and collector. Likewise, a built-in barrier is formed between the collector and base.

In other words, in the first situation, only a little light absorption occurs in the collector side i-type layer, due to the effects of the electrical field from the built-in barrier.

Consequently, when light passes through the collector side i-type layer in the first situation, electrons (shown with a black circles in the figure) and holes (shown with a white circle in the figure) are created or generated by the slight absorption of light hv in the collector side i-type layer. For the carrier created or generated in such a collector side i-type layer, electrons diffuse to the emitter side and holes diffuse to the collector side.

In the first situation, the electrons diffusing to the emitter side are prevented from flowing by the built-in barrier produced near the emitter side i-type layer. Consequently, electrons gradually accumulated in the conduction band of the base, conduction band of the emitter side i-type layer, and conduction band of the collector side i-type layer. As a result, in the first situation, the conduction band of the collector side i-type layer is mostly occupied by electrons (band-filling effect) and little or no light absorption occur in the collector side i-type layer.

Next, the second situation, where the collector side has a lower potential than the emitter side, specifically when the emitter is positive (+) and the collector is negative (−), will be explained using FIG. 10.

In this case, the vicinity of the collector side i-type layer, which is the P-i-N junction portion, is put in reverse bias while the vicinity of the emitter side i-type layer is in forward bias.

Consequently, an electrical field, caused by the reverse biasing, is applied to the collector side i-type layer and great absorption of light hv occurs due to the field absorption effect; the created or generated holes flow to the collector side. Meanwhile, the built-in barrier becomes small in the vicinity of the emitter side i-type layer in forward biasing; as a result, electrons generated or created in the collector side i-type layer flow to the emitter side without accumulating in the base. In the second situation, therefore, band-filling effects do not occur and continuous light absorption in the collector side i-type layer becomes possible.

Also, the thickness and concentration of impurities in the N-type region, which is the base, may be established so that holes flowing from the emitter side do not pass through the base into the collector side i-type layer. Consequently, if the N-type region, which is the base in the P-i-N-i-P junction structure, is thick enough and has a high concentration of impurities, emission and recombination in the collector side i-type layer in this second situation can be suppressed.

Furthermore, in the third situation, the collector side has a higher potential than the emitter side, specifically the emitter is negative (−) and the collector is positive (+). This situation is explained using FIG. 11. In this case, the collector side i-type layer is put in forward bias. Consequently, there is no light absorption because there is no reverse voltage in the collector side i-type layer. Furthermore, in the third situation, electrons do not flow to the collector side i-type layer. Consequently, there is no emission and recombination in the collector side i-type layer in the third situation as well.

According to the finding of the inventors, the P-i-N-i-P junction structure, having the characteristics explained above in the case where light is transmitted by the collector side i-type layer, has the current-voltage characteristics shown in FIG. 3(A) and the extinction characteristics shown in FIG. 3(B). FIGS. 3(A) and 3(B) show that the P-i-N-i-P junction structure has the following current-voltage characteristics and extinction characteristics in the operating region of a conventional semiconductor optical functional element having formed therein a P-i-N junction structure, specifically, in the voltage region (corresponds to the second situation, with the explanation of the characteristics in the case of light being transmitted by the aforementioned collector side i-type layer) wherein the collector side P-i-N junction structure is put in reverse bias. The current-voltage characteristics and extinction characteristics exhibit the same type of field absorption effects as those in the conventional electroabsorption optical modulator having formed therein a P-i-N junction structure, except for the parallel movement to the reverse biased side by only the built-in voltage va of the emitter side P-i-N junction portion.

Furthermore, in the P-i-N-i-P junction structure as shown in FIG. 3(A), the breakdown voltage, in the voltage region in the collector side P-i-N junction portion, is the sum of the reverse withstand voltage vb of the collector side P-i-N junction structure and the built in voltage vc of the emitter side P-i-N junction. Also, in the voltage region where the collector side P-i-N junction portion is in forward bias, specifically the voltage region outside the operating region of the conventional semiconductor optical functional element to which the P-i-N junction is applied, the breakdown voltage becomes the sum of the built-in voltage vc of the collector side P-i-N junction portion and the reverse withstand voltage vb of the emitter side P-i-N junction portion.

In other words, in the P-i-N-i-P junction structure, there is no sudden current flow to the collector side i-type layer if the difference in potential between the collector and emitter reaches the sum of the built in voltage vc of one P-i-N junction portion and the reverse withstand voltage vb of another P-i-N junction portion. Consequently, the P-i-N-i-P junction structure can be applied to a semiconductor optical functional element with the capacity to maintain withstand voltage, electrically, across a wide voltage range from positive to negative. This voltage range is −14V to +1.5V in conventional elements; in the element of the present invention, the range is −15 V to +15 V.

Next, the operation of the optical modulator 100, of the present embodiment which is provided the P-i-N-i-P junction structure having the properties explained above, is explained with reference back to FIG. 7.

Moreover, in the optical modulator 100, the upper cladding layer 116a of the first stacked body 120a forming the optical waveguide 130 corresponds to the collector; the light absorption layer 114a, which is the core of the optical waveguide 130, corresponds to the collector side i-type layer. Furthermore, in the optical modulator 100, the lower cladding layer 112 corresponds to the base. In the optical modulator 100, the central layer 114b of the second stacked body 120b corresponds to the emitter side i-type layer; the upper cladding layer 116b of the second stacked body 120b corresponds to the emitter.

In the optical modulator 100, the voltage applied to the first electrode 122a is applied to the upper cladding layer 116a, corresponding to the collector, through the ohmic contact layer 118a of the first stacked body 120a. Furthermore, in the optical modulator 100, the voltage applied to the second electrode 122b is applied to the upper cladding layer 116b, corresponding to the emitter, through the ohmic contact layer 118b of the second stacked body 120b.

Consequently, in the optical modulator 100, band filling effects occur in the light absorption layer 114a of the optical waveguide 130 when voltage is not applied to both the first electrode 122a and second electrode 122b (corresponding to the first situation in the explanation of the P-i-N-i-P junction structure). As a result, the following occurs. With the optical modulator 100, an optical signal S1 is input to the light absorption layer 114a, which is the core of the optical waveguide 130, from the first element end surface 100a. The optical signal S1 passes through the light absorption layer 114a without being absorbed and is output as the optical signal S2 to the second element end surface 100b from the light absorption layer 114a.

In the case where more negative voltage is applied to the first electrode 122a than the second electrode 122b (corresponding to the second situation in the explanation of the P-i-N-i-P junction structure), the light absorption layer 114a, which is the core of the optical loaveguide 130, is put in reverse bias and continuous light absorption becomes possible. As a result, the following occurs. An optical signal S1 is input to the light absorption layer 114a, which is the core of the optical waveguide 130, from the first element end surface 100a. The intensity of the optical signal S1 is modulated by absorption in the light absorption layer 114a and this is output from the light absorption layer 114a to the second element end surface 100b as a modulated optical signal S3.

Furthermore, in the case where more positive voltage is applied to the first electrode 122a than the second electrode 122b (corresponding to the third situation in the explanation of the P-i-N-i-P junction structure), the light absorption layer 114a, which is the core of the optical waveguide 130, is put in forward bias and there is no absorption of light by the light absorption layer 114a. As a result, the following occurs. An optical signal S1 is input to the light absorption layer 114a, which is the core of the optical waveguide 130, from the first element end surface 100a. This optical signal S1 is output as an optical signal S4 from the light absorption layer 114a to the second element end surface 100b.

The optical modulator 100 of the present embodiment functions as capacity to maintain withstand voltage across the wide range of voltages from positive to negative as explained above. The results of an experiment, performed in order to confirm this fact, using an optical modulator having the same basic constitution as the optical modulator 100 of the present embodiment, are explained with reference to FIGS. 12 and 13. This experiment measured the electrical reflection coefficient S11 which increases when a mismatch of impedance occurs where strong current flows in the direction of the junction in a semiconductor junction portion. FIG. 12 shows the data attained from measuring the electrical reflection coefficient S11 for an optical modulator having the same basic structure as the optical modulator 100. Meanwhile, FIG. 13 shows data attained from measuring the electrical reflection coefficient S11 for a conventional optical modulator. In FIGS. 12 and 13, the horizontal axis shows the frequency (GHz) applied between the electrodes and the vertical axis shows the electrical reflection coefficient S11 (dB).

In this experiment, the conventional optical modulator and the optical modulator having the same basic constitution as the optical modulator 100 of the present embodiment are made of the same materials and have the same dimensions: the semiconductor substrate is an n-InP wafer, the lower cladding layer is a 2 μm thick n-InP layer, the light absorption layer is a 0.25 μm thick undoped InGaAsP layer, the upper cladding layer is a 1.5 μm thick p-InP layer, and the ohmic contact layer is a 0.2 μm thick p$^+$-InGaAs layer. The power supply line, with impedance 50 Ω, used for the external power supply terminates in a 50 Ω resistor connected parallel to the sample optical modulator.

Specifically, the power supply line is connected to the first electrode (122a in FIG. 7); the 50 Ω resistor is between the first electrode and a ground and grounds the second electrode (122b in FIG. 7). Voltage was applied from the power supply line to the first electrode and the electrical reflection coefficient to the power supply line was measured. The voltage applied to the conventional element was −5 V, −2 V, 0 V, +0.5 V, and +1 V; each voltage was measured at frequencies of 0–20 GHz. In the same way, the voltage applied to the element with the structure according to the present invention was −5 V, −2 V, 0 V, +1 V, and +5 V, and was measured within at frequencies of 0–20 GHz.

FIGS. 12 and 13 show marked differences under conditions when (where symbol for applied voltage was positive) the light absorption layer (i-type layer in waveguide structure) of the optical modulators was in forward bias. Specifically, the conventional optical modulator showed a sudden increase in electrical reflection coefficient at applied voltages from around +0.5 V. Meanwhile, the optical modulator having the same basic constitution as the optical modulator 100 of the present embodiment showed no deterioration of electrical reflection coefficient S11.

Furthermore, even under conditions where the i-type layer in the optical waveguide is in reverse bias (when the applied voltage is negative, specifically −2 V and −5 V), the conventional optical modulator had an electrical reflection coefficient S11 at 10 GHz of over −5 dB. Meanwhile, the electrical reflection coefficient S11 at 10 GHz was greatly improved to −9 dB for the optical modulator having the same basic constitution as the optical modulator 100 of the present embodiment.

The optical modulator 100 was used as an example in the explanation for the present embodiment, but the present embodiment is not limited to the constitution of the optical modulator 100.

The present embodiment can also be applied to an optical modulator 152 having the following constitution. As shown in FIG. 14, for example, a lower cladding layer 112a and light absorption layer 114 are layered or stacked in that order on the semiconductor substrate 108; furthermore, a first layered or stacked body 170a and a second layered or stacked body 170b, holding an insulating layer 154 therebetween, are formed on the light absorption layer 114. The first stacked body 170a comprises an upper cladding layer 116a having on its upper surface an ohmic contact layer 118a, which is in contact with a first electrode 122a. The second stacked body 17C)b comprises an upper cladding layer 116b having on its upper surface an ohmic contact layer 118b, which is in contact with a second electrode 122b.

In the optical modulator 100 as shown in FIG. 7, for example, the second layered or stacked body 120b corresponding to the second semiconductor stacked structure is formed as a stripe across the first element end surface 100a and the second element end surface 100b. In the present embodiment, the second semiconductor stacked structure is not necessary a stripe structure and the end portions thereof can terminate within the optical functional element.

As explained above, electrical reflection in the positive voltage range can be reduced in the optical modulator of the present embodiment. Consequently, aforementioned electrical reflection back to the front portion of the optical modulator is reduced and pattern effects can be suppressed. Furthermore, in the optical modulator of the present embodiment, current does not flow into the i-type layer even under conditions when the i-type layer in the optical waveguide is in forward bias. Consequently, with the present embodiment, ASE generation can be suppressed even in positive voltage ranges.

In other words, the optical modulator of the present embodiment can be applied to uses where the operating voltage is in the positive range. Consequently, this can be applied to optical modulators wherein the mark side voltage of the applied electrical signal is set to a range wherein forward voltage is applied to the P-i-N junction, in uses where the optical waveform cross point is set in the center of the level and uses where the width of the mark side level is small. As a result, use of the optical modulator of the present embodiment can be expected to greatly improve signal to noise ratios in optical signals and to extent the range to which optical signals can be transmitted.

Furthermore, the application of positive voltage in a conventional optical modulator results in current flowing into the P-i-N junction portion, generating Joule heat, and causing heat-related deterioration. Consequently, in order to prevent the generation of Joule heat, due to high forward current, the conventional optical modulator requires that voltage be applied as follows: reverse voltage is initially applied, then a high frequency signal is applied. However, the optical modulator of the present embodiment of the present invention can withstand a wide range of voltages from positive to negative. As a result, a high forward current will not flow, even if biased voltage is applied to the optical modulator of the present embodiment even after a high frequency signal is applied as the driving power. Consequently, if the optical modulator of the present embodiment of the present invention is used, the order in which the voltage is applied does not matter in the case where superimposed voltages are applied.

Furthermore, in the optical modulator of the present embodiment, the generation of heat due to Joule heat can be suppressed without a surge of current into the optical waveguide layer even in the case of positive bias voltages. Consequently, the loss of reliability can be prevented for an optical modulator and hence a semiconductor optical functional element, according to the present embodiment.

Furthermore, in the optical modulator of the present embodiment, surge voltage can be prevented, even when a surge of forward voltage is applied, if the voltage is less than the sum of the built in voltage of the P-i-N junction in the optical waveguide (usually 0.7 V) and the reverse withstand voltage of the other P-i-N junction (usually 10 V or more). Consequently, the present embodiment can provide an optical modulator which can withstand power surges.

Moreover, the optical modulator of the present embodiment can be produced without any changes to crystal growth processes used in the past, and with only slight changes to a mask pattern used in etching in the production process.

Sixth Embodiment

Figure 15:
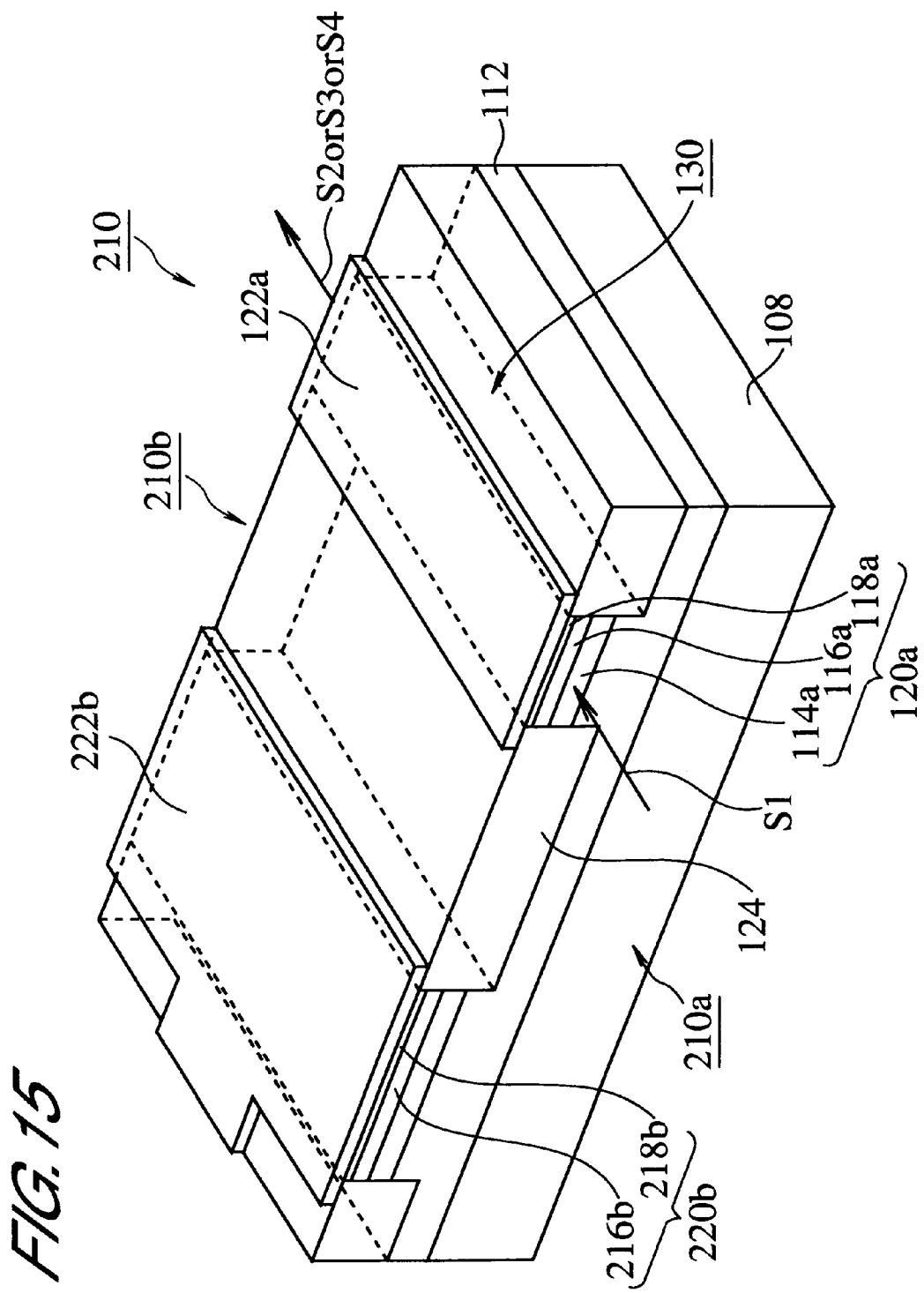
FIG. 15 is a perspective view showing the constitution of another optical modulator to which the present invention can be applied.
Figure 16:
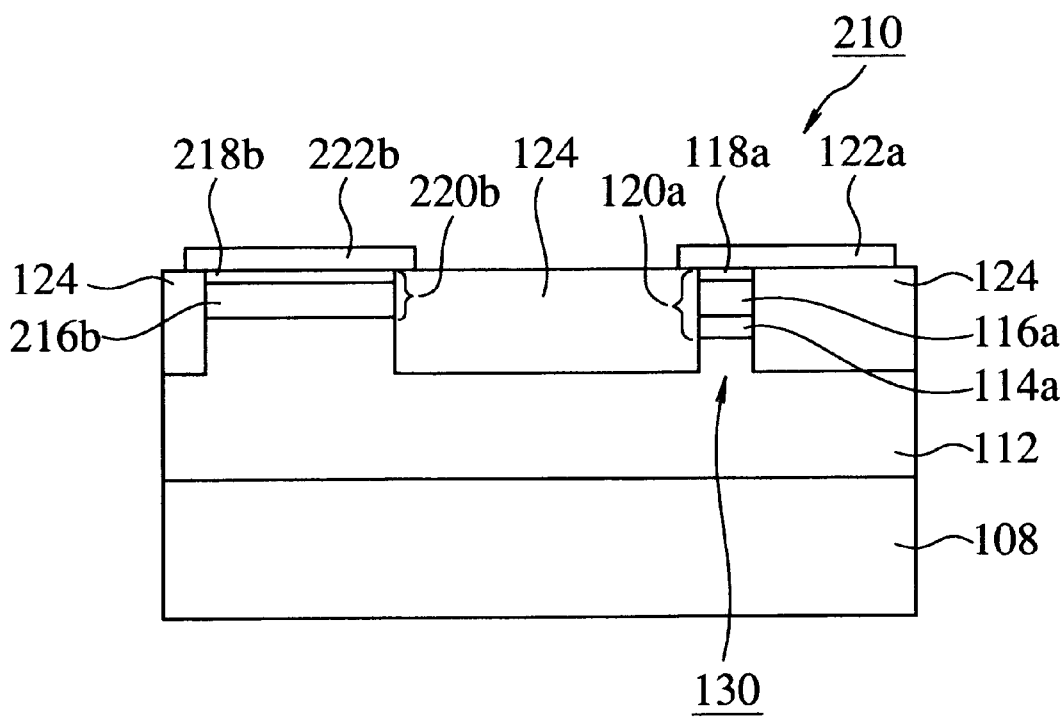
FIG. 16 is a front view showing the constitution of the optical modulator shown in FIG. 15.
Figure 17:
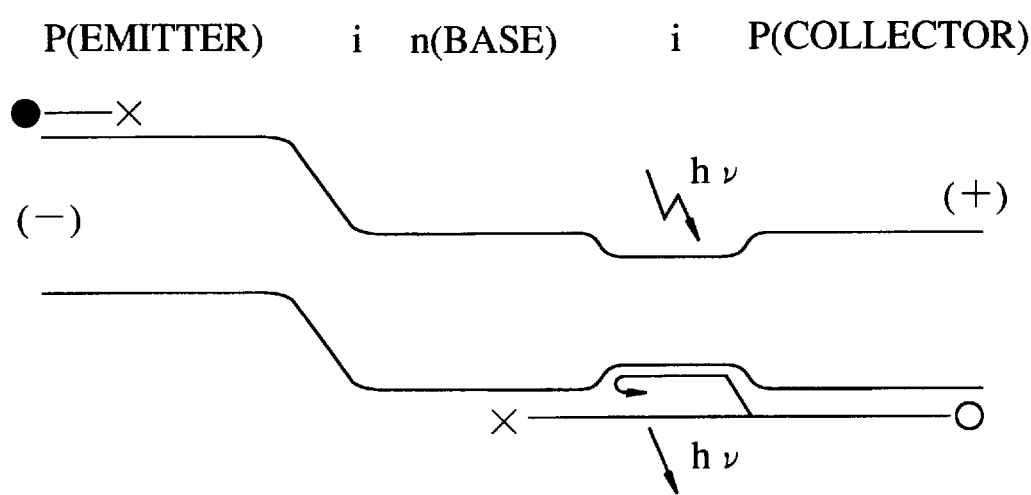
FIG. 17 is another energy diagram for explaining the operation of the optical modulator shown in FIG. 15.
Figure 18:
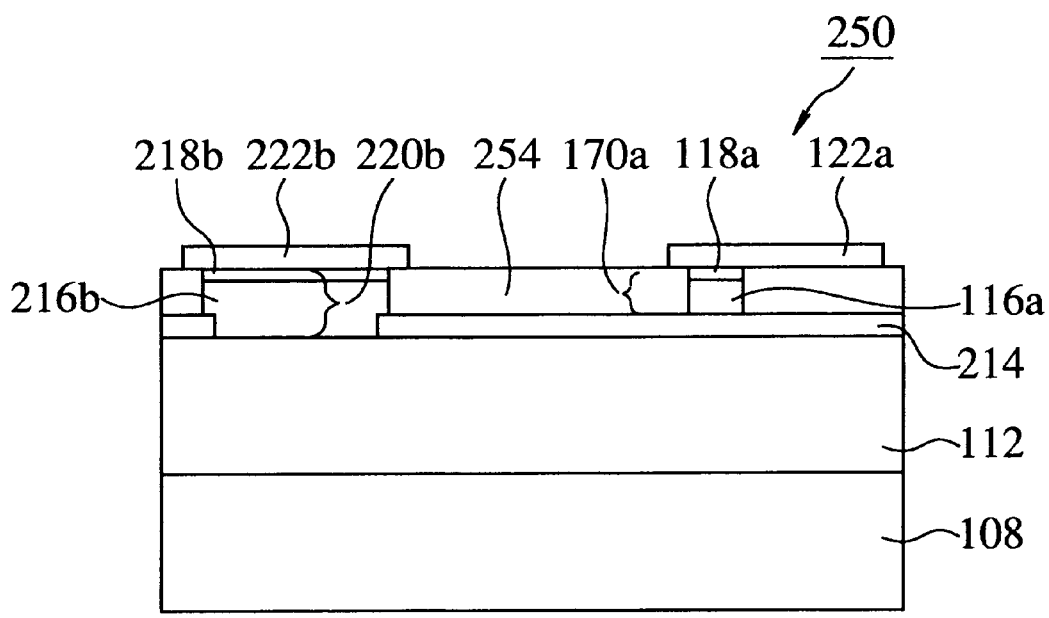
FIG. 18 is a front view showing the constitution of another optical modulator to which the present invention can be applied.

Next, the sixth embodiment of the present invention is explained with reference to FIGS. 15–18. Moreover, FIG. 15 is a perspective view showing the constitution of an optical modulator 210, which is an electroabsorption optical modulator of the present embodiment. FIG. 16 is a front view showing the constitution of the optical modulator 210. FIGS. 9, 10 and 17 are energy diagrams for explaining the operation of the optical modulator 210. FIG. 18 is a front view showing the constitution of another optical modulator 250 of the present embodiment.

As shown in FIGS. 15 and 16, the optical modulator 210 of the present embodiment has a constitution which is different in part from the optical modulator 100 of the fifth embodiment. Specifically, instead of a second stacked body 120b having a P-i-N heterojunction structure as in the optical modulator in FIG. 7, the optical modulator 210 of the present embodiment is provided a third layered or stacked body 220*b* formed on the lower cladding layer 112 and comprising an upper cladding layer 216*b*, comprising p-InP, for example, which corresponds to the separate or individual cladding layer and has on its upper surface an ohmic contact layer 218*b*, comprising p⁺-InGaAs, and which is in contact with a second electrode 222*b*.

In effect, the optical modulator 210 of the present embodiment is constituted with a third stacked body 220*b*, having a P-N homojunction structure comprising a lower cladding layer 112 and an upper cladding layer 216*b*, located below the second electrode 222*b*.

Moreover, like the optical modulator 100 of the fifth embodiment, the optical modulator 210 of the present embodiment has, as a core of the optical waveguide 130, a light absorption layer 114*a* comprising undoped InGaAsP, which is the i-type layer of the P-i-N heterojunction structure formed in the first stacked body. Furthermore, in the optical modulator 210, like in the optical modulator 100 of the fifth embodiment, the structure and composition wavelength of the light absorption layer 114*a* are established so that light is absorbed due to an increase in the light absorption coefficient in only the case where an electrical field is applied to the light absorption layer 114*a*. There is no light absorption when an electrical field is not applied to the light absorption layer 114*a*.

Consequently, the optical modulator 210 of the present embodiment is provided a P-i-N-P junction structure with the light absorption layer 114*a* as the i-type layer.

The situation where light passes through the i-type layer is explained using the energy diagrams in FIGS. 9, 10 and 17 for the P-i-N heterojunction structure employed in the optical modulator 210 of the present embodiment. Moreover, as in the explanation for the P-i-N-i-P junction structure employed in the optical modulator 100 of the fifth embodiment, this explanation uses the case where the present embodiment is used as a P-N-P junction transistor, with an N-type region as the base, a P-type region on the P-i-N junction side as the collector, and a P-type region on the P-N junction side as the emitter. In the P-i-N-P junction structure as well, the situation when light passes through the i-type layer located on the collector side, changes due to the difference in potential of the P-type regions; both cases are explained separately.

The first situation is explained as the case where the P-i-N-P junction structure reaches thermal equilibrium, specifically when voltage is not applied to the emitter and collector from outside, as shown in FIG. 9.

The inventors found in this case that a built in barrier occurs between the collector and base, near the i-type layer having a low carrier concentration, and that little light absorption occurs in the i-type layer under the influence of an electrical field of such a built in barrier. Meanwhile, a built in barrier occurs near the P-N junction portion between the emitter and base.

Consequently, when light passes through the i-type layer, electrons (shown by black circles in the figure) and holes (shown by white circles in the figure) are produced by the slight absorption of light hv.

The electrons generated or created in the i-type layer diffuse toward the emitter. Meanwhile, the holes generated or created in the i-type layer diffuse toward the collector. However, the flow of the holes is prevented by the built in barrier near the junction of the emitter and base. Consequently, in the first situation for the P-i-N-P junction structure, a band filling effect occurs and there is no absorption of light in the i-type layer, like the first situation for the P-i-N-i-P junction structure of the fifth embodiment.

Next, the second situation will be explained with reference to FIG. 10. The second situation is the case where the collectors in the P-i-N-P junction structure is negatively biased with reference to the emitter side.

In this situation, the collector side is put in reverse bias and an electrical field is applied to the i-type layer. Consequently, there is much light absorption in the i-type layer due to the field absorption effect and the holes generated flow toward the collector. Furthermore, the emitter side becomes forward biased and the barrier between the base and emitter becomes small. Because the junction of the base and emitter is a P-N homojunction, there is no energy discontinuity of the valence electron band and conduction band and a smooth barrier is realized. Consequently, the electrons can smoothly pass through the P-N junction portion of the base and emitter.

In effect, in the second situation for the P-i-N-P junction structure, the electrons, which are photocarriers, pass through the base and emitter junction in a shorter time than in the second situation of the P-i-N-i-P junction structure of the fifth embodiment.

In the second situation of the P-i-N-P junction structure, the thickness and concentration of impurities of the N-type region which is the base may be established so that holes flowing from the emitter side do not pass through the base and into the collector side i-type layer. Consequently, in the P-i-N-P junction structure, emission and recombination in the collector side i-type layer can be suppressed like in the P-i-N-i-P junction structure.

Furthermore, the third situation will be explained with reference to FIG. 17. The third situation is where the collector side has a positive bias potential in relation to the emitter side.

In this case, a forward bias is applied to the i-type layer. Consequently, there is no light absorption in the i-type layer. Furthermore, in the third situation, electrons do not go towards the collector side i-type layer. Consequently, in the third situation as well, there is no emission and recombination in the collector side i-type layer.

Moreover, in the third situation for the P-i-N-P junction structure, reverse voltage is stored in the P-N homojunction portion of the emitter and base. However, even if incident light is assumed to strike in the vicinity of the P-N homojunction portion of the emitter and base, the band gap wavelength of the P-N junction of the emitter and base is a sufficiently short wavelength in relation to the wavelength of the incident light. Consequently, absorption of light does not occur in the third situation.

Next, the optical modulator 210 of the present embodiment which is provided a P-i-N-P junction structure displaying the characteristics explained above, will be explained with reference to FIG. 15 once more.

Moreover, in the optical modulator 210, the upper side cladding layer 116*a* of the first stacked body 120*a* forming the optical waveguide 130 corresponds to the collector and the light absorption layer 114*a* which is the core of the optical waveguide 130 corresponds to the i-type layer. Furthermore, in the optical waveguide layer 210, the lower side cladding layer 112 corresponds to the base. Furthermore, in the optical modulator 210, the upper cladding layer 116*b* of the third stacked body 220*b* corresponds to the emitter.

In the optical modulator 210, the voltage applied to the first electrode 122*a* is applied to the upper side cladding layer 116*a* corresponding to the collector by means of the ohmic contact layer 118*a* of the first stacked body 120*a*. The voltage applied to the third electrode 222b is applied to the upper cladding layer 216b corresponding to the emitter by means of the ohmic contact layer 218b of the third stacked body 220b.

Consequently, in the optical modulator 210, band filling effects occur in the light absorption layer 114a of the optical waveguide 130, in the situation where voltage is not applied to both the first electrode 122a and the third electrode 222b (in other words, this corresponds to the first situation for the P-i-N-P junction structure). As a result, the following occurs in the optical modulator 210. An optical signal S1 is input to the light absorption layer 114a, which is the core of the optical waveguide 130, from the first element end surface 210a. The optical signal S1 passes through the light absorption layer 114a without being absorbed and is output to the second element end surface 210b side from the light absorption layer 114a as the optical signal S2.

In the case where positive voltage is applied to the first electrode 122a in respect to the third electrode 222b, the upper cladding layer 116a of the first stacked body 120a comes to have a higher potential than the upper cladding layer 216b of the third stacked body 220b (in other words, this corresponds to the second situation for the P-i-N-P junction structure). In such a situation, the light absorption layer 114a, which is the core of the optical waveguide 130, is put in reverse bias and continuous light absorption becomes possible. As a result, the following occurs. An optical signal S1 is input to the light absorption layer 114a, which is the core of the optical waveguide 130, from the first element end surface 210a. The intensity of the optical signal S1 is modulated by absorption in the light absorption layer 114a as prescribed, and the optical signal S3 is output to the s econd element end surface 210b side from the light absorption layer 114a as the optical signal S3.

Furthermore, in the situation where negative voltage is applied to the first electrode 122a in respect to the third electrode 222b, the upper cladding layer 116a of the first stacked body 120a comes to have a lower potential than the upper cladding layer 216b of the third stacked body 220b (in other words, this corresponds to the third situation for the P-i-N-P junction structure). In such a situation, the light absorption layer 114a which is the core of the optical waveguide 130, is put in forward bias and there is no light absorption in the light absorption layer 114a. As a result, the following occurs. An optical signal S1 is input to the light absorption layer 114a, which is the core of the optical waveguide 130, from the first element end surface 210a. The optical signal S1 is output to the second element end surface 210b side from the light absorption layer 114a as the optical signal S4.

As explained above, a high current does not enter the optical modulator 210 of the present embodiment, even when forward voltage in excess of the built in voltage is applied the light absorption layer 114a corresponding to the core of the optical waveguide 130. Consequently, with the present embodiment, pattern effects and the generation of Joule heat caused by injected current, for example, can be suppressed. As a result, the present embodiment can provide an optical modulator for various uses, such as uses in low loss operations and uses for generating a coded optical signal with a cross point near the interface between mark and space.

Furthermore, in the optical modulator 100 of the fifth embodiment, the P-i-N heterojunction of the second stacked body 120b has an energy discontinuity of the conduction band and valence band at P-i heterojunction and an i-N heterojunction, which are two hetero-interfaces; and the carrier flow passing therethrough can be resisted. Meanwhile, in the optical modulator 210 of the present embodiment, the area of the energy discontinuity interface is less than that of the optical modulator 100 of the first embodiment; the amount of the energy discontinuity produced at the discontinuity interface is also reduced. Consequently, on the P-N homojunction side of the third stacked body 220b located directly below the second electrode 222b, carrier sweep is carried out smoothly and the carrier passes through quickly. As a result, an optical modulator which maintains high speed response up to high frequency regions can be realized with the present embodiment.

Furthermore, when the second stacked body 120b and the first stacked body 120a forming the optical waveguide 130 are too close, the optical modulator 100 of the fifth embodiment becomes like an optical directional coupler and becomes unable to effect the prescribed modulation of light. Since there is no optical waveguide layer in the third stacked body, the optical modulator 210 of the present embodiment does not act as an optical directional coupler even if the P-N homojunction of the third stacked body 222b is located at a position close to the P-i-N heterojunction in the optical waveguide 130. Consequently, in the optical modulator 210, the upper cladding layer 116a corresponding to the collector can be positioned close to the upper cladding layer 216b of the third stacked body 220b corresponding to the emitter. As a result, a decrease in the time for optical alignment can be expected with the optical modulator 210 of the present embodiment, because the reduction of the conductor resistance in the lower cladding layer 112 corresponding to the base can be realized without a loss of optical alignment in particular.

Moreover, the optical modulator 210 of the present invention can be manufactured easily using known crystal growth and process techniques, such as the method for forming a mask and selectively growing the light absorption layer, or the method of forming the light absorption layer on the entire surface and then etching away the portions of the light absorption layer to form the third stacked body 220b.

As shown in FIG. 18, the present embodiment can also be applied to an optical modulator 250 having the following constitution. A lower cladding layer 112 is layered or stacked on a semiconductor substrate 108; the light absorption layer 214 is layered or stacked on portions of the lower cladding layer 112 other than the third stacked body 220b. Furthermore, a first layered or stacked body 170a and third layered or stacked body 220b are formed on the light absorption layer 214 and have an insulating layer 154 therebetween. The first stacked body 170a comprises an upper cladding layer 116a having on its upper surface an ohmic contact layer 118a in contact with a first electrode 122a.

Like the fifth embodiment, the present embodiment does not require that the layered or stacked body corresponding to the second semiconductor layer structure necessarily have a striped structure, and the end portion thereof may terminate within the optical functional element.

Seventh Embodiment

Figure 19:
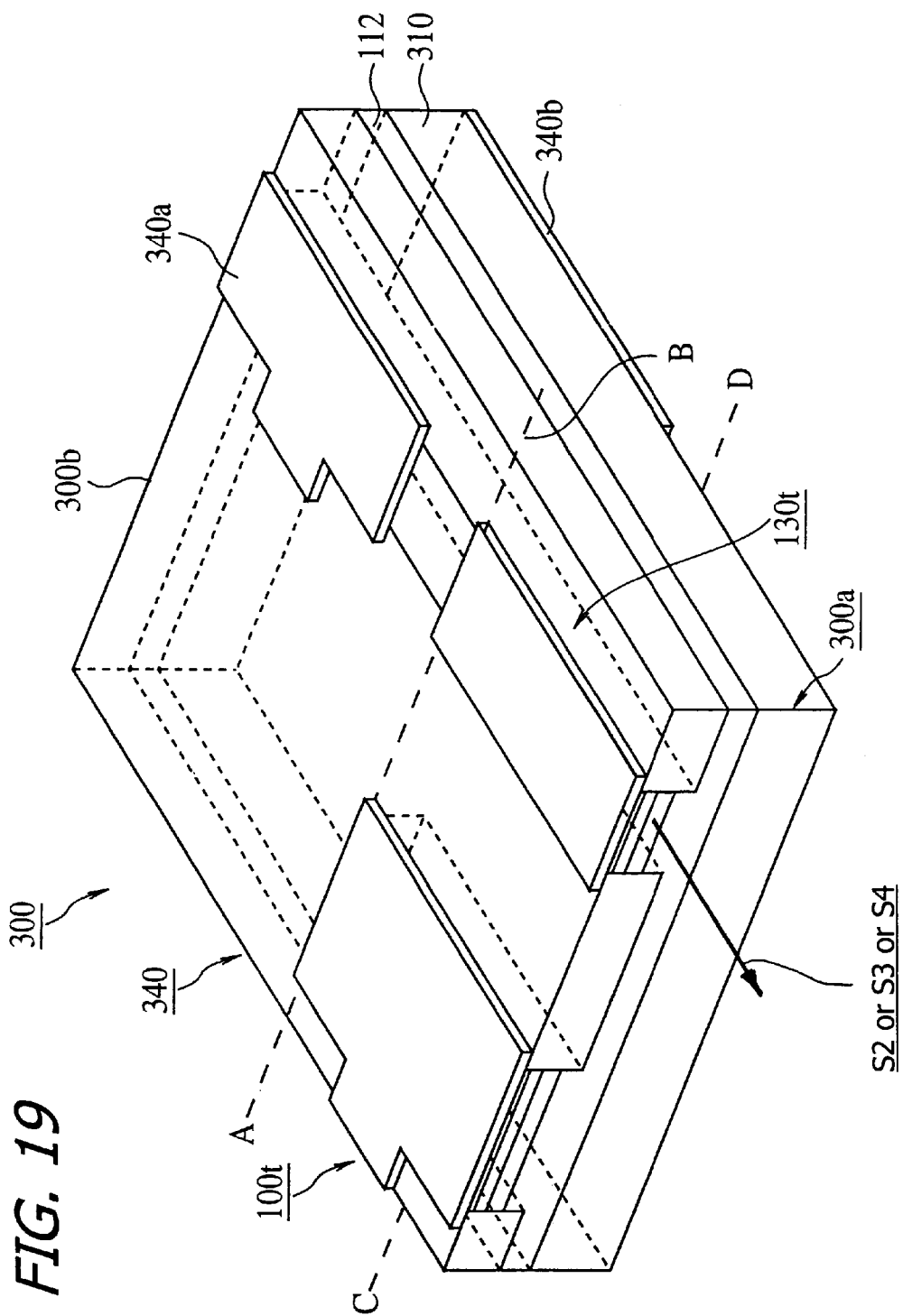
FIG. 19 is a perspective view of a semiconductor optical functional element to which the present invention can be applied.

The one-chip type of electroabsorption optical modulator which can be applied to the present invention was explained above. Next, however, the semiconductor optical functional element, which is an application of the optical modulator of the fifth embodiment, will be explained with reference to FIG. 19. Moreover, FIG. 19 is a perspective view showing the constitution of the semiconductor optical functional element 300.

The semiconductor optical functional element 300 of the present embodiment is constituted as follows: an optical modulator 100t located on the front side and a semiconductor laser 340 located on the back side are formed on an n-type semiconductor substrate 310, with the boundary being the surface described by lines A–B and C–D in FIG. 19.

The optical modulator 100t constituting the semiconductor optical functional element 300 is applied to a semiconductor substrate 310 instead of the semiconductor substrate 108, in the optical modulator 100 of the fifth embodiment shown in FIG. 7.

Meanwhile, the semiconductor laser 340, comprising the semiconductor optical functional element 300 of the present embodiment, is a waveguide-type semiconductor laser formed with both an optical modulator 100t and optical waveguide 130t. Moreover, in the semiconductor optical functional element 300 of the present embodiment, an upper current input electrode 340a and a lower current input electrode 340b are established so as to be perpendicular to the optical waveguide 130t of such a semiconductor laser 340 located therebetween.

Moreover, in the semiconductor optical functional element 300, a film coating having the prescribed transmittance or transmission factor is applied on a second element 300b end surface and first element end surface 300a, which are two element end surfaces showing both end surfaces of the optical waveguide 130t.

Consequently, the semiconductor optical functional element 300 of the present embodiment functions as a mode-locking laser pulse generating device, due to the optical modulation action of the optical modulator 100t and the oscillation action of the semiconductor laser 340.

The semiconductor optical functional element 300 of the present embodiment was explained above. In the present embodiment, however, a DFB laser (distributed feedback laser) or DBR laser (Bragg reflection laser) could be formed on the semiconductor substrate 310, instead of the semiconductor laser 340. In such a case, it is also possible to construct an optical functional element called a modulator-integrated light source, which functions as a light source integrated with the modulator, by coating the first element end surface 300a with a non-reflective film.

The semiconductor optical functional element 300 according to the present embodiment can also constitute an optical functional element which functions as an integrated element with an optical modulator and semiconductor optical amplifier, through coating a non-reflective (AR) film on the second element end surface 300b on the side toward the semiconductor laser 340.

The preferred embodiments of the present invention are explained above with reference to the attached figures, but the present invention is not limited to the constitutions. A skilled in the art may consider various changes and improvements within the scope of the technology noted in the claims; such changes and improvements also fall within the scope of the present invention.

For example, the fifth through seventh embodiments were explained using the example of an optical modulator having the P-i-N-i-P junction structure or P-i-N-P junction structure, but the present invention is not limited to such constitutions. The present invention can also be applied to an N-i-P-i-N junction structure or an optical modulator having an N-i-P-i-N junction structure.

The fifth through seventh embodiments were explained using the example of an optical modulator having the junction on the side not used as an optical waveguide formed as a P-i-N junction or P-N junction portion, but the present invention is not limited to such constitutions. In the present invention, the junction portion on the side not used as an optical waveguide may be a junction portion wherein the band gap wavelength is sufficiently shorter than the incident light. Consequently, the present invention can also be applied to an optical modulator using a junction portion formed with InGaAs or InGaAsP polycrystal between an n-type layer and p-type layer, for example, or P-i-N homojunction, P-N heterojunction, P-i-N homo- and heterojunctions (P-i-N homo- and heterojunctions are junctions wherein either P-i or i-N is a homojunction and the other is a heterojunction), as the junction portion on the side not used as the optical waveguide.

Furthermore, the fifth through seventh embodiments were explained using the example of an optical modulator and semiconductor optical functional element formed on a semiconductor substrate comprising n-InP, but the present invention is not limited to this constitution. The present invention can also be applied to optical modulators and semiconductor optical functional elements formed on substrates comprising various other materials and polarities, for example an n-type semiconductor comprising material other than n-InP, p-type semiconductor, undoped semiconductor, insulator of Fe-doped InP, or the like.

Furthermore, the fifth through seventh embodiments were explained using the example of an optical modulator having an Fe-InP insulating layer as the resistive layer, but the present invention is not limited to this constitution. The present invention can also be applied to optical modulators having other types of resistive layers, such as resistive layers comprising undoped InP or resistive layers comprising organic insulating materials such as polyimide. This resistive layer may be a layer having a resistance sufficiently higher than the forward resistance of a P-i-N junction. For example, the resistivity of a resistive layer is preferably 1 $\Omega \cdot cm$ or more. In the case of the structure shown in FIG. 7, for example, the resistance value of this resistive layer is established so that current does not flow from the first electrode 122a to the resistive layer 124 and then to the lower cladding layer 112, but may also be established so that current does not flow from the first electrode 122a, to the resistive layer 124, and then to the second electrode 122b.

Furthermore, the fifth through seventh embodiments were explained using the example of an optical modulator comprising mainly InP, but the present invention is not limited to this constitution. The present invention can also be applied to optical modulators comprising mainly GaAs, for example.

Furthermore, in the optical modulator explained in the fifth through seventh embodiments, an i-type layer and undoped layer themselves were used, but in the case where impurities were included in these layers, the concentration of the impurities is preferably $10^{17}$ cm$^{-3}$ or less. The present invention may be applied to other layers including impurities. In the present invention, impurities may be diffused in various other concentrations in the n-type cladding layer and p-type cladding layer.

Furthermore, the aforementioned embodiments were explained using the example of an optical modulator wherein the optical waveguide layer is an InGaAsP crystal, but the present invention is not limited to this constitution. The present invention can also be applied to other types of optical waveguide layers, such as optical waveguide layers with multiple quantum well structures, or optical waveguide layers with lattice strain introduced thereto.

Furthermore, the fifth through seventh embodiments were explained using the example of an electroabsorption optical modulator, but the present invention is not limited to this constitution. The present invention can also be applied to various other optical modulators, such as optical phase modulators, wherein the index of refraction of the optical waveguide layer is varied by the application of an electrical field and thereby the optical phase is modulated, or optical intensity modulators constituting Mach-Zehnder interferometers.

Furthermore, the fifth through seventh embodiments were explained using the example of an optical modulator, but the present invention is not limited to this constitution. The present invention can also be applied to other types of semiconductor optical functional element, such as a supersaturation absorption optical switch or wavelength switch.

Furthermore, the fifth through seventh embodiments were explained using the example of an optical modulator or a semiconductor optical functional element comprising an optical modulator and semiconductor laser, but the present invention is not limited to this constitution. The present invention can also be applied to other types of semiconductor optical functional element, for example, optical modulator devices such as electroabsorption optical modulators, phase modulators, and Mach-Zehnder optical intensity modulators, or semiconductor optical functional elements such as supersaturation absorption devices or wavelength switches, or to semiconductor optical functional elements integrated with other types of waveguide semiconductor optical functional elements such as semiconductor lasers.

With the third and fourth aspects of the present invention, the probability of a strong current flowing when an electrical field is applied to the optical waveguide layer is greatly reduced, because the withstand voltage properties of the semiconductor optical functional element can be improved. Consequently, it becomes possible to prevent decreased life and damage to the semiconductor optical functional element due to the generation of Joule heat. Meanwhile, electrical reflection and so forth due to ASE generation and impedance mismatching are reduced and it becomes possible to realized reduced noise in the transmission of optical signals.

Furthermore, it is possible to expand the uses of semiconductor optical functional elements because of the improved withstand voltage properties due to the third and fourth aspects of the present invention. Consequently, it is possible to realize semiconductor optical functional elements which will be useful in the construction of super high speed optical communications systems, expected to be realized in the near future.

What is claimed is:

1. A semiconductor optical functional element comprising:
    a first semiconductor layer structure in which a common cladding layer, an optical waveguide layer, and a first separate cladding layer are stacked in that order in a first direction, said optical waveguide layer extending in second and third directions normal to the first direction and to each other;
    a second semiconductor layer structure in which said common cladding layer and a second separate cladding layer are stacked in that order in the first direction;
    a resistive layer separating at least said first separate cladding layer and said second separate cladding layer in the second direction;
    a first voltage applying means electrically coupled to said first separate cladding layer; and
    a second voltage applying means electrically coupled to said second separate cladding layer;
    wherein said common cladding layer is of a conductivity type different than both that of said first separate cladding layer and that of said second separate cladding layer; and wherein said optical waveguide laver is optically conductive in the third direction when voltages respectively applied by said first and second voltage applying means differ by more than a threshold, and is optically nonconductive in the third direction when the applied voltages differ by less than the threshold.

2. The semiconductor optical functional element according to claim 1, wherein said resistive layer is an insulating layer.

3. The semiconductor optical functional element according to claim 1, wherein said optical waveguide layer is formed of a semiconductor layer having a lower carrier concentration than the carrier concentration of said common cladding layer and said first separate cladding layer.

4. The semiconductor optical functional element according to claim 1, wherein said common cladding layer, said optical waveguide layer, and said first separate cladding layer form a double heterojunction structure.

5. The semiconductor optical functional element according to claim 1, wherein the real portion of the complex index of refraction of said optical waveguide layer is varied by the application of an electrical field.

6. The semiconductor optical functional element according to claim 1, wherein the imaginary portion of the complex index of refraction of said optical waveguide layer is varied by the application of an electrical field.

7. The semiconductor optical functional element according to claim 1, wherein the real portion of the complex index of refraction of said optical waveguide layer is varied by light being input to said optical waveguide layer.

8. The semiconductor optical functional element according to claim 1, wherein the imaginary portion of the complex index of refraction of said optical waveguide layer is varied by light being input to said optical waveguide layer.

9. The semiconductor optical functional element according to claim 1, wherein said semiconductor layer structure further includes an intermediate semiconductor layer between said common cladding layer and said second separate cladding layer.

10. A semiconductor optical functional device, comprising:
    a single substrate;
    a semiconductor optical functional element formed on said substrate;
    a semiconductor laser source formed on said substrate; and
    an optical waveguide, formed on said substrate, connecting said semiconductor optical functional element and said semiconductor laser source;
    said semiconductor functional element including
        a first semiconductor laver structure in which a common cladding layer, an optical waveguide layer, and a first separate cladding laver are stacked in that order in a first direction, said optical waveguide laver extending in second and third directions normal to the first direction and to each other,
        a second semiconductor laver structure in which said common cladding laver and a second separate cladding layer are stacked in that order in the first direction, a resistive layer separating at least said first separate cladding layer and said second separate cladding layer in the second direction, a first voltage applying means electrically coupled to said first separate cladding layer, and a second voltage applying means electrically coupled to said second separate cladding layer, wherein said common cladding layer is of a conductivity type different than both that of said first separate cladding layer and that of said second separate cladding layer, and wherein said optical waveguide layer is optically conductive in the third direction when voltages respectively applied by said first and second voltage applying means differ by more than a threshold, and is optically nonconductive in the third direction when the applied voltages differ by less than the threshold.

11. The semiconductor optical functional device according to claim 10, wherein said semiconductor layer structure further includes an intermediate semiconductor layer between said common cladding layer and said second separate cladding layer.

* * * * *